US007081900B2

(12) United States Patent
Gonsalves et al.

(10) Patent No.: US 7,081,900 B2
(45) Date of Patent: Jul. 25, 2006

(54) GRAPHICAL USER INTERFACE FOR COLOR CORRECTION

(75) Inventors: Robert Gonsalves, Wellesley, MA (US); Michael Laird, Nashua, NH (US)

(73) Assignee: Avid Technology, Inc., Tewksbury, MA (US)

( * ) Notice: Subject to any disclaimer, the term of this patent is extended or adjusted under 35 U.S.C. 154(b) by 0 days.

(21) Appl. No.: 10/440,766

(22) Filed: May 19, 2003

(65) Prior Publication Data

US 2003/0197710 A1 Oct. 23, 2003

Related U.S. Application Data

(62) Division of application No. 09/293,730, filed on Apr. 16, 1999, now Pat. No. 6,847,373.

(51) Int. Cl.
*G09G 5/02* (2006.01)
(52) U.S. Cl. .................. 345/594; 345/440; 345/650; 345/661; 345/676
(58) Field of Classification Search ............... 345/594, 345/440, 650, 661, 676
See application file for complete search history.

(56) References Cited

U.S. PATENT DOCUMENTS

| | | | |
|---|---|---|---|
| 2,995,727 | A | 8/1961 | Quade |
| 3,095,653 | A | 7/1963 | Corrigan |
| 3,316,536 | A | 4/1967 | Andrews et al. |
| 3,465,289 | A | 9/1969 | Klein |
| 3,546,791 | A | 12/1970 | Koos et al. |
| 3,599,221 | A | 8/1971 | Baer |
| 3,606,688 | A | 9/1971 | Zawels et al. |

(Continued)

FOREIGN PATENT DOCUMENTS

EP 0313796 5/1989

(Continued)

OTHER PUBLICATIONS

Bauersfeld, P.F. et al., "The 3D Perceptual Picker: Color Selection in 3d", SID 90 Digest, 1990, pp. 180-183.

(Continued)

*Primary Examiner*—Kee M. Tung
*Assistant Examiner*—Tam Tran
(74) *Attorney, Agent, or Firm*—Peter J. Gordon

(57) ABSTRACT

A graphical user interface facilitates color modification of a sequence of segments of moving images on a display of a general purpose computer. The graphical user interface may include a three-image display. The three image display may include a first region on the display for displaying an image from a current segment in the sequence to which a color modification is to be applied, a second region on the display and adjacent to the first region for displaying an image from a previous segment in the sequence before the current segment, and a third region on the display and adjacent to the first region for displaying an image from a next segment in the sequence after the current segment. A function screen allows a user to select a color modification to be performed to the current image. The function screen may include an interface that simultaneously displays a plurality of user modifiable graphs. The graphs may include a first graph for a red component, a second graph for a blue component, and a third graph for a green component. Each graph maps input values for a color component of a pixel on a first axis to output values for the color component for the pixel on a second axis. The graphical user interface also may include a color matcher.

87 Claims, 16 Drawing Sheets

U.S. PATENT DOCUMENTS

| | | |
|---|---|---|
| 3,671,668 A | 6/1972 | Reiffel |
| 3,792,437 A | 2/1974 | Blumenthal et al. |
| 3,810,627 A | 5/1974 | Levy |
| 3,848,082 A | 11/1974 | Summers |
| 3,889,062 A | 6/1975 | Epstein |
| 3,899,775 A | 8/1975 | Larsen |
| 3,910,322 A | 10/1975 | Hardesty, Jr. et al. |
| 3,964,179 A | 6/1976 | Bennett |
| 3,993,861 A | 11/1976 | Baer |
| 3,999,307 A | 12/1976 | Tsuda et al. |
| 4,012,132 A | 3/1977 | Lazarus |
| 4,014,004 A | 3/1977 | Fuller |
| 4,044,380 A | 8/1977 | Justice et al. |
| 4,052,798 A | 10/1977 | Tomita et al. |
| 4,071,697 A | 1/1978 | Bushnell et al. |
| 4,071,740 A | 1/1978 | Gogulski |
| 4,124,109 A | 11/1978 | Bissell et al. |
| 4,141,078 A | 2/1979 | Bridges, Jr. et al. |
| 4,141,548 A | 2/1979 | Everton |
| 4,166,540 A | 9/1979 | Marshall |
| 4,189,742 A | 2/1980 | Klopsch |
| 4,208,652 A | 6/1980 | Marshall |
| 4,210,961 A | 7/1980 | Whitlow et al. |
| 4,247,759 A | 1/1981 | Yuris et al. |
| RE30,579 E | 4/1981 | Goldman et al. |
| RE30,580 E | 4/1981 | Goldman et al. |
| 4,264,924 A | 4/1981 | Freeman |
| 4,268,744 A | 5/1981 | McGeary |
| 4,271,351 A | 6/1981 | Bloodworth |
| 4,272,780 A | 6/1981 | Belmares-Sarabia et al. |
| 4,286,323 A | 8/1981 | Meday |
| 4,290,688 A | 9/1981 | Call |
| 4,329,684 A | 5/1982 | Monteath et al. |
| 4,331,973 A | 5/1982 | Eskin et al. |
| 4,339,798 A | 7/1982 | Hedges et al. |
| 4,355,372 A | 10/1982 | Johnson et al. |
| 4,359,631 A | 11/1982 | Lockwood et al. |
| 4,367,465 A | 1/1983 | Mati et al. |
| 4,373,133 A | 2/1983 | Clyne et al. |
| 4,377,870 A | 3/1983 | Anderson et al. |
| 4,385,311 A | 5/1983 | Harwood et al. |
| 4,388,008 A | 6/1983 | Greene et al. |
| 4,396,985 A | 8/1983 | Ohara |
| 4,410,908 A | 10/1983 | Belmares-Sarabia et al. |
| 4,418,358 A | 11/1983 | Poetsch et al. |
| 4,449,186 A | 5/1984 | Kelley et al. |
| 4,451,701 A | 5/1984 | Bendig |
| 4,458,320 A | 7/1984 | Sutton |
| 4,484,328 A | 11/1984 | Schlafly |
| 4,488,245 A | 12/1984 | Dalke et al. |
| 4,492,978 A | 1/1985 | Thomas |
| 4,494,197 A | 1/1985 | Troy et al. |
| 4,500,880 A | 2/1985 | Gomersall et al. |
| 4,538,188 A | 8/1985 | Barker et al. |
| 4,541,806 A | 9/1985 | Zimmerman et al. |
| 4,546,382 A | 10/1985 | McKenna et al. |
| 4,554,446 A | 11/1985 | Murphy et al. |
| 4,571,632 A | 2/1986 | Schaphorst et al. |
| 4,573,072 A | 2/1986 | Freeman |
| RE32,115 E | 4/1986 | Lockwood et al. |
| 4,588,881 A | 5/1986 | Pejas et al. |
| 4,592,546 A | 6/1986 | Fascenda et al. |
| 4,593,904 A | 6/1986 | Graves |
| 4,597,046 A | 6/1986 | Musmanno et al. |
| 4,602,279 A | 7/1986 | Freeman |
| 4,602,286 A | 7/1986 | Kellar et al. |
| 4,603,232 A | 7/1986 | Kurland et al. |
| 4,608,601 A | 8/1986 | Shreck et al. |
| 4,611,996 A | 9/1986 | Stoner |
| 4,614,342 A | 9/1986 | Takashima |
| 4,625,275 A | 11/1986 | Smith |
| 4,630,040 A | 12/1986 | Haertling |
| 4,630,108 A | 12/1986 | Gomersall |
| 4,634,147 A | 1/1987 | McClure |
| 4,636,950 A | 1/1987 | Caswell et al. |
| 4,642,632 A | 2/1987 | Ohyagi et al. |
| 4,642,676 A | 2/1987 | Weinger |
| 4,642,767 A | 2/1987 | Lerner |
| 4,646,145 A | 2/1987 | Percy et al. |
| 4,658,290 A | 4/1987 | McKenna et al. |
| 4,670,853 A | 6/1987 | Stepien |
| 4,671,772 A | 6/1987 | Slade et al. |
| 4,674,041 A | 6/1987 | Lemon et al. |
| 4,679,067 A | 7/1987 | Belmares-Sarabia et al. |
| 4,689,742 A | 8/1987 | Troy et al. |
| 4,694,329 A | 9/1987 | Belmares-Sarabia et al. |
| 4,698,666 A | 10/1987 | Lake, Jr. et al. |
| 4,699,532 A | 10/1987 | Smith |
| 4,703,423 A | 10/1987 | Bado et al. |
| 4,713,761 A | 12/1987 | Sharpe et al. |
| 4,723,212 A | 2/1988 | Mindrum et al. |
| 4,727,412 A | 2/1988 | Fearing et al. |
| 4,733,230 A | 3/1988 | Kurihara et al. |
| 4,734,858 A | 3/1988 | Schlafly |
| 4,745,468 A | 5/1988 | Von Kohorn |
| 4,750,050 A | 6/1988 | Belmares-Sarabia et al. |
| 4,750,151 A | 6/1988 | Baus |
| 4,752,877 A | 6/1988 | Roberts et al. |
| 4,760,527 A | 7/1988 | Sidley |
| 4,763,186 A | 8/1988 | Belmares-Sarabia et al. |
| 4,774,663 A | 9/1988 | Musmanno et al. |
| 4,775,935 A | 10/1988 | Yourick |
| 4,782,397 A | 11/1988 | Kimoto |
| 4,791,281 A | 12/1988 | Johnsen et al. |
| 4,792,018 A | 12/1988 | Humble et al. |
| 4,794,460 A | 12/1988 | Shiota |
| 4,794,530 A | 12/1988 | Yukiura et al. |
| 4,807,031 A | 2/1989 | Broughton et al. |
| 4,811,084 A | 3/1989 | Balmares-Sarabia et al. |
| 4,812,986 A | 3/1989 | Smith |
| 4,816,904 A | 3/1989 | McKenna et al. |
| 4,821,101 A | 4/1989 | Short |
| 4,823,184 A | 4/1989 | Balmares-Sarabia et al. |
| 4,825,045 A | 4/1989 | Humble |
| 4,827,344 A | 5/1989 | Astle et al. |
| 4,833,308 A | 5/1989 | Humble |
| 4,833,710 A | 5/1989 | Hirashima |
| 4,839,829 A | 6/1989 | Freedman |
| 4,842,278 A | 6/1989 | Markowicz |
| 4,847,690 A | 7/1989 | Perkins |
| 4,853,882 A | 8/1989 | Marshall |
| 4,856,787 A | 8/1989 | Itkis |
| 4,857,994 A | 8/1989 | Belmares-Sarabia et al. |
| 4,858,000 A | 8/1989 | Lu |
| 4,862,251 A | 8/1989 | Belmares-Sarabia et al. |
| 4,866,511 A | 9/1989 | Belmares-Sarabia et al. |
| 4,870,596 A | 9/1989 | Smith |
| 4,875,164 A | 10/1989 | Monfort |
| 4,876,589 A | 10/1989 | Orsburn et al. |
| 4,876,592 A | 10/1989 | Von Kohorn |
| 4,882,675 A | 11/1989 | Nichtberger et al. |
| 4,882,724 A | 11/1989 | Vela et al. |
| 4,890,321 A | 12/1989 | Seth-Smith et al. |
| 4,894,784 A | 1/1990 | Smith |
| 4,896,791 A | 1/1990 | Smith |
| 4,907,071 A | 3/1990 | Balmares-Sarabia et al. |
| 4,907,079 A | 3/1990 | Turner et al. |
| 4,908,761 A | 3/1990 | Tai |
| 4,910,672 A | 3/1990 | Off et al. |
| 4,922,522 A | 5/1990 | Scanlon |
| 4,926,255 A | 5/1990 | Von Kohorn |
| 4,926,256 A | 5/1990 | Nanba |
| 4,929,819 A | 5/1990 | Collins, Jr. |
| 4,930,011 A | 5/1990 | Kiewit |

| | | | | | |
|---|---|---|---|---|---|
| 4,937,742 A | 6/1990 | Marshall | 5,249,044 A | 9/1993 | Von Kohorn |
| 4,937,853 A | 6/1990 | Brule et al. | 5,250,789 A | 10/1993 | Johnsen |
| 4,949,256 A | 8/1990 | Humble | 5,253,043 A | 10/1993 | Gibson |
| 4,959,686 A | 9/1990 | Spallone et al. | 5,278,752 A | 1/1994 | Narita et al. |
| 4,959,783 A | 9/1990 | Scott et al. | 5,283,651 A | 2/1994 | Ishizuka |
| 4,965,437 A | 10/1990 | Nagai | 5,283,731 A | 2/1994 | Lalonde et al. |
| 4,972,504 A | 11/1990 | Daniel, Jr. et al. | 5,283,734 A | 2/1994 | Von Kohorn |
| 4,973,952 A | 11/1990 | Malec et al. | 5,285,278 A | 2/1994 | Holman |
| 4,974,170 A | 11/1990 | Bouve et al. | 5,287,181 A | 2/1994 | Holman |
| 4,975,951 A | 12/1990 | Bennett | 5,287,268 A | 2/1994 | McCarthy |
| 4,982,337 A | 1/1991 | Burr et al. | 5,289,295 A | 2/1994 | Yumiba et al. |
| 4,982,346 A | 1/1991 | Girouard et al. | 5,295,064 A | 3/1994 | Malec et al. |
| 4,984,156 A | 1/1991 | Mekata | 5,305,195 A | 4/1994 | Murphy |
| 4,992,940 A | 2/1991 | Dworkin | 5,305,197 A | 4/1994 | Axler et al. |
| 4,996,705 A | 2/1991 | Entenmann et al. | 5,310,997 A | 5/1994 | Roach et al. |
| 5,003,384 A | 3/1991 | Durden et al. | 5,313,275 A | 5/1994 | Daly et al. |
| 5,003,472 A | 3/1991 | Perrill et al. | 5,317,678 A | 5/1994 | Okawara et al. |
| 5,010,485 A | 4/1991 | Bigari | 5,325,449 A | 6/1994 | Burt et al. |
| 5,014,125 A | 5/1991 | Pocock et al. | 5,327,066 A | 7/1994 | Smith |
| 5,014,212 A | 5/1991 | Smith | 5,350,197 A | 9/1994 | Schmidt |
| 5,034,807 A | 7/1991 | Von Kohorn | 5,351,186 A | 9/1994 | Bullock et al. |
| 5,039,848 A | 8/1991 | Stoken | 5,353,218 A | 10/1994 | DeLapa et al. |
| 5,047,614 A | 9/1991 | Bianco | 5,368,129 A | 11/1994 | Von Kohorn |
| 5,048,833 A | 9/1991 | Lamie | 5,373,327 A | 12/1994 | McGee et al. |
| 5,057,915 A | 10/1991 | Von Kohorn | 5,380,991 A | 1/1995 | Valencia et al. |
| 5,063,610 A | 11/1991 | Alwadish | 5,381,185 A | 1/1995 | Ohki et al. |
| 5,069,453 A | 12/1991 | Koza et al. | 5,382,970 A | 1/1995 | Kiefl |
| 5,070,397 A | 12/1991 | Wedderburn-Bisshop | 5,392,385 A | 2/1995 | Evangelisti et al. |
| 5,070,404 A | 12/1991 | Bullock et al. | 5,398,123 A | 3/1995 | Katsuma |
| 5,077,604 A | 12/1991 | Kivolowitz | 5,401,946 A | 3/1995 | Weinblatt |
| 5,077,607 A | 12/1991 | Johnson et al. | RE34,915 E | 4/1995 | Nichtberger et al. |
| 5,083,272 A | 1/1992 | Walker et al. | 5,410,326 A | 4/1995 | Goldstein |
| 5,089,882 A | 2/1992 | Kaye et al. | 5,410,692 A | 4/1995 | Tores |
| 5,093,718 A | 3/1992 | Hoarty et al. | 5,412,191 A | 5/1995 | Baitz et al. |
| 5,111,196 A | 5/1992 | Hunt | 5,412,416 A | 5/1995 | Nemirofsky |
| 5,111,927 A | 5/1992 | Schulze, Jr. | 5,412,773 A | 5/1995 | Carlucci et al. |
| 5,117,355 A | 5/1992 | McCarthy | 5,418,895 A | 5/1995 | Lee |
| 5,119,295 A | 6/1992 | Kapur | 5,420,606 A | 5/1995 | Begum et al. |
| 5,128,520 A | 7/1992 | Rando et al. | 5,420,971 A | 5/1995 | Westerink et al. |
| 5,128,752 A | 7/1992 | Von Kohorn | 5,424,754 A * | 6/1995 | Bar et al. .................... 345/549 |
| 5,129,013 A | 7/1992 | Holzman et al. | 5,430,644 A | 7/1995 | Deaton et al. |
| 5,130,789 A | 7/1992 | Dobbs et al. | 5,438,355 A | 8/1995 | Palmer |
| 5,134,688 A | 7/1992 | Corthout | 5,438,651 A | 8/1995 | Suzuki et al. |
| 5,140,416 A | 8/1992 | Tinkler | 5,444,835 A | 8/1995 | Turkowski |
| 5,142,273 A | 8/1992 | Wobermin | 5,446,919 A | 8/1995 | Wilkins |
| 5,146,325 A | 9/1992 | Ng | 5,448,471 A | 9/1995 | Deaton et al. |
| 5,153,937 A | 10/1992 | Wobermin et al. | 5,450,134 A | 9/1995 | Legate |
| 5,155,591 A | 10/1992 | Wachob | 5,459,306 A | 10/1995 | Stein et al. |
| 5,158,310 A | 10/1992 | Tannehill et al. | 5,465,206 A | 11/1995 | Hilt et al. |
| 5,159,549 A | 10/1992 | Hallman, Jr. et al. | H1506 H * | 12/1995 | Beretta ........................ 345/591 |
| 5,173,594 A | 12/1992 | McClure | 5,479,590 A | 12/1995 | Lin |
| 5,173,851 A | 12/1992 | Off et al. | 5,488,423 A | 1/1996 | Walkingshaw et al. |
| 5,176,224 A | 1/1993 | Spector | 5,488,429 A | 1/1996 | Kojima et al. |
| 5,179,641 A | 1/1993 | Comins et al. | 5,488,674 A | 1/1996 | Burt et al. |
| 5,179,652 A | 1/1993 | Rozmanith et al. | 5,490,060 A | 2/1996 | Malec et al. |
| 5,181,113 A | 1/1993 | Chang | 5,500,514 A | 3/1996 | Veeneman et al. |
| 5,185,695 A | 2/1993 | Pruchnicki | 5,500,681 A | 3/1996 | Jones |
| 5,191,645 A | 3/1993 | Carlucci et al. | 5,502,636 A | 3/1996 | Clarke |
| 5,192,854 A | 3/1993 | Counts | 5,504,519 A | 4/1996 | Remillard |
| 5,193,056 A | 3/1993 | Boes | 5,506,946 A | 4/1996 | Bar et al. |
| 5,202,756 A | 4/1993 | Sasaki et al. | 5,508,731 A | 4/1996 | Kohorn |
| 5,202,826 A | 4/1993 | McCarthy | 5,510,843 A | 4/1996 | Keene et al. |
| 5,208,445 A | 5/1993 | Nahar et al. | 5,510,851 A | 4/1996 | Foley et al. |
| 5,214,792 A | 5/1993 | Alwadish | 5,513,126 A | 4/1996 | Harkins et al. |
| 5,218,671 A | 6/1993 | Liao et al. | 5,515,098 A | 5/1996 | Carles |
| 5,227,874 A | 7/1993 | Von Kohorn | 5,523,794 A | 6/1996 | Mankovitz et al. |
| 5,235,509 A | 8/1993 | Meuller et al. | 5,528,490 A | 6/1996 | Hill |
| 5,237,157 A | 8/1993 | Kaplan | 5,532,751 A | 7/1996 | Lui |
| 5,237,499 A | 8/1993 | Garback | 5,557,334 A | 9/1996 | Legate |
| 5,239,480 A | 8/1993 | Huegel | 5,557,339 A | 9/1996 | Dadourian |
| 5,241,372 A | 8/1993 | Ohba | 5,557,340 A | 9/1996 | Millward |
| 5,243,174 A | 9/1993 | Veeneman et al. | 5,557,518 A | 9/1996 | Rosen |
| 5,245,533 A | 9/1993 | Marshall | 5,557,721 A | 9/1996 | Fite et al. |

| | | | | | | |
|---|---|---|---|---|---|---|
| 5,559,617 A * | 9/1996 | Mitsui et al. ............... 349/117 | | 5,774,868 A | 6/1998 | Cragun et al. |
| 5,584,025 A | 12/1996 | Keithley et al. | | 5,793,849 A | 8/1998 | Young et al. |
| 5,585,858 A | 12/1996 | Harper et al. | | 5,805,169 A | 9/1998 | Harada et al. |
| 5,592,378 A | 1/1997 | Cameron et al. | | 5,812,647 A | 9/1998 | Beaumont et al. |
| 5,592,379 A | 1/1997 | Finfrock et al. | | 5,826,241 A | 10/1998 | Stein et al. |
| 5,592,560 A | 1/1997 | Deaton et al. | | 5,832,457 A | 11/1998 | O'Brien et al. |
| 5,594,910 A | 1/1997 | Filepp et al. | | 5,839,117 A | 11/1998 | Cameron et al. |
| 5,600,376 A | 2/1997 | Casavant et al. | | 5,845,259 A | 12/1998 | West et al. |
| 5,604,542 A | 2/1997 | Dedrick | | 5,848,399 A | 12/1998 | Burke |
| 5,611,030 A * | 3/1997 | Stokes ....................... 345/590 | | 5,852,671 A | 12/1998 | Oshima |
| 5,612,527 A | 3/1997 | Ovadia | | 5,855,007 A | 12/1998 | Jovicic et al. |
| 5,612,868 A | 3/1997 | Off et al. | | RE36,116 E | 2/1999 | McCarthy |
| 5,615,324 A | 3/1997 | Kuboyama | | 5,870,724 A | 2/1999 | Lawlor et al. |
| 5,621,812 A | 4/1997 | Deaton et al. | | 5,877,755 A | 3/1999 | Hellhake |
| 5,625,421 A | 4/1997 | Faroudja et al. | | 5,877,772 A | 3/1999 | Nomura et al. |
| 5,630,037 A | 5/1997 | Schindler | | 5,888,444 A | 3/1999 | Dannenhauer et al. |
| 5,630,125 A | 5/1997 | Zellweger | | 5,907,315 A | 5/1999 | Vlahos et al. |
| 5,633,687 A | 5/1997 | Bhayani et al. | | 5,907,830 A | 5/1999 | Engel et al. |
| 5,634,101 A | 5/1997 | Blau | | 5,909,673 A | 6/1999 | Gregory |
| 5,635,979 A | 6/1997 | Kostreski et al. | | 5,970,469 A | 10/1999 | Scroggie et al. |
| 5,636,290 A | 6/1997 | Kita et al. | | 5,974,396 A | 10/1999 | Anderson et al. |
| 5,636,346 A | 6/1997 | Saxe | | 6,009,411 A | 12/1999 | Kepecs |
| 5,638,136 A | 6/1997 | Kojima et al. | | 6,012,038 A | 1/2000 | Powell |
| 5,638,138 A | 6/1997 | Hickman | | 6,014,634 A | 1/2000 | Scroggie et al. |
| 5,638,457 A | 6/1997 | Deaton et al. | | 6,035,280 A | 3/2000 | Christensen |
| 5,644,723 A | 7/1997 | Deaton et al. | | 6,038,367 A | 3/2000 | Abecassis |
| 5,645,884 A | 7/1997 | Harlow, Jr. et al. | | 6,076,068 A | 6/2000 | DeLapa et al. |
| 5,647,677 A | 7/1997 | Smith | | 6,099,043 A | 8/2000 | Story |
| 5,649,114 A | 7/1997 | Deaton et al. | | 6,185,501 B1 | 2/2001 | Smith et al. |
| 5,651,238 A | 7/1997 | Belec et al. | | 6,256,062 B1 | 7/2001 | Endo |
| 5,655,961 A | 8/1997 | Acres et al. | | 6,292,786 B1 | 9/2001 | Deaton et al. |
| 5,659,469 A | 8/1997 | Deaton et al. | | 6,321,210 B1 | 11/2001 | O'Brien et al. |
| 5,659,639 A | 8/1997 | Mahoney et al. | | 6,417,891 B1 | 7/2002 | Cacciatore et al. |
| 5,659,793 A | 8/1997 | Escobar | | 6,477,271 B1 | 11/2002 | Cooper et al. |
| 5,661,525 A | 8/1997 | Kovacevic et al. | | 6,487,362 B1 | 11/2002 | Yuen et al. |
| 5,663,765 A | 9/1997 | Matsuse et al. | | 6,504,551 B1 | 1/2003 | Takashima et al. |
| 5,664,111 A | 9/1997 | Nahan et al. | | 6,552,731 B1 | 4/2003 | Gonsalves |
| 5,664,771 A | 9/1997 | Nagatani et al. | | 6,571,255 B1 | 5/2003 | Gonsalves et al. |
| 5,682,443 A | 10/1997 | Gouch et al. | | 6,847,373 B1 | 1/2005 | Gonsalves et al. |
| 5,687,322 A | 11/1997 | Deaton et al. | | 6,850,249 B1 | 2/2005 | Gu |
| 5,689,648 A | 11/1997 | Diaz et al. | | 2003/0007663 A1 * | 1/2003 | Wixson et al. ............... 382/100 |
| 5,694,323 A | 12/1997 | Koropitzer et al. | | | | |
| 5,694,546 A | 12/1997 | Reisman | | | | |
| 5,696,965 A | 12/1997 | Dedrick | | | | |
| 5,697,844 A | 12/1997 | Von Kohorn | | | | |
| 5,701,161 A | 12/1997 | Williams et al. | | EP | 0205332 | 10/1990 |
| 5,703,654 A | 12/1997 | Iizuka | | EP | 0512839 | 11/1992 |
| 5,703,659 A | 12/1997 | Tanaka | | EP | 0517035 | 12/1992 |
| 5,703,795 A | 12/1997 | Mankovitz | | EP | 0594312 | 4/1994 |
| 5,708,782 A | 1/1998 | Larson et al. | | EP | 0494325 | 11/1995 |
| 5,710,884 A | 1/1998 | Dedrick | | EP | 0702832 | 3/1996 |
| 5,710,886 A | 1/1998 | Christensen et al. | | EP | 0709806 | 5/1996 |
| 5,715,314 A | 2/1998 | Payne et al. | | EP | 0871177 | 10/1998 |
| 5,715,377 A | 2/1998 | Fukushima et al. | | EP | 0741492 | 3/1999 |
| 5,717,923 A | 2/1998 | Dedrick | | GB | 2312120 | 10/1997 |
| 5,724,521 A | 3/1998 | Dedrick | | GB | 2312348 | 10/1997 |
| 5,724,525 A | 3/1998 | Beyers, II et al. | | WO | WO94/29868 | 12/1994 |
| 5,729,693 A | 3/1998 | Holda-Fleck | | WO | WO96/13807 | 5/1996 |
| 5,734,719 A | 3/1998 | Tsevdos et al. | | WO | WO 97/06631 | 2/1997 |
| 5,734,720 A | 3/1998 | Salganicoff | | WO | WO97/39452 | 10/1997 |
| 5,734,823 A | 3/1998 | Saigh et al. | | WO | WO 98/11510 | 3/1998 |
| 5,743,745 A | 4/1998 | Reintjes | | | | |
| 5,745,121 A | 4/1998 | Politis | | | | |
| 5,752,238 A | 5/1998 | Dedrick | | | | |
| 5,754,180 A | 5/1998 | Kivolowitz et al. | | | | |
| 5,754,787 A | 5/1998 | Dedrick | | | | |
| 5,758,257 A | 5/1998 | Hertz et al. | | | | |
| 5,759,101 A | 6/1998 | Von Kohorn | | | | |
| 5,761,648 A | 6/1998 | Golden et al. | | | | |
| 5,761,662 A | 6/1998 | Dasan | | | | |
| 5,768,521 A | 6/1998 | Dedrick | | | | |
| 5,770,299 A | 6/1998 | Dannenhauer et al. | | | | |
| 5,774,112 A | 6/1998 | Kasson | | | | |

FOREIGN PATENT DOCUMENTS

OTHER PUBLICATIONS

Bauersfeld, P.F. et al., "User-Oriented Color Interface Design: Direct Manipulation Of Color In Context", 1991, pp. 417-418.

www.daicolor.co.jp/color/english/color_e/color_e01_.html.

U.S. Appl. No. 09/293,590, filed Apr. 16, 1999, Cacciatore et al.

Alan Wm. Paeth, "Distance Approximations And Bounding Polyhedra", Academic Press, Inc., 1995, pp. 78-87, References cited in the parent application, U.S. Appl. No. 6,847,373.

James D. Foley, et al., "Fundamentals of Interactive Computer Graphics", Addison-Wesley Publishing Co., Inc., 1982, pp. 245-249, References cited in the parent application, U.S. Appl. No. 6,847,373.

Eric N. Mortensen, et al., "Intelligent Scissors For Image Composition", Computer Graphics Proceedings, Annual Conference Series 1995, Siggraph 95 Conference Proceedings, Aug. 6-11, 1995, ACM Siggraph, pp. 191-198, References cited in the parent application, U.S. Appl. No. 6,847,373.

Alvy Ray Smith, et al., "Blue Screen Matting", Computer Graphics Proceedings, Annual Conference Series, 1996, SIGGRAPH 96, Aug. 4-9, 1996, pp. 259-268, References cited in the parent application, U.S. Appl. No. 6,847,373.

Enter References cited in the parent application, U.S. Appl. No. 6,847,373 User's Guide, Discreet Logic, Apr. 1999, pp. 145-160, References cited in the parent application, U.S. Appl. No. 6,847,373.

Kiernan, Michael, "The Color Scanning Success Handbook", 1997, pp. 139-162, References cited in the parent application, U.S. Appl. No. 6,847,373.

Smoke* User's Guide, Discreet Logic, Apr. 1999, pp. 615-631, References cited in the parent application, U.S. Appl. No. 6,847,373.

* cited by examiner

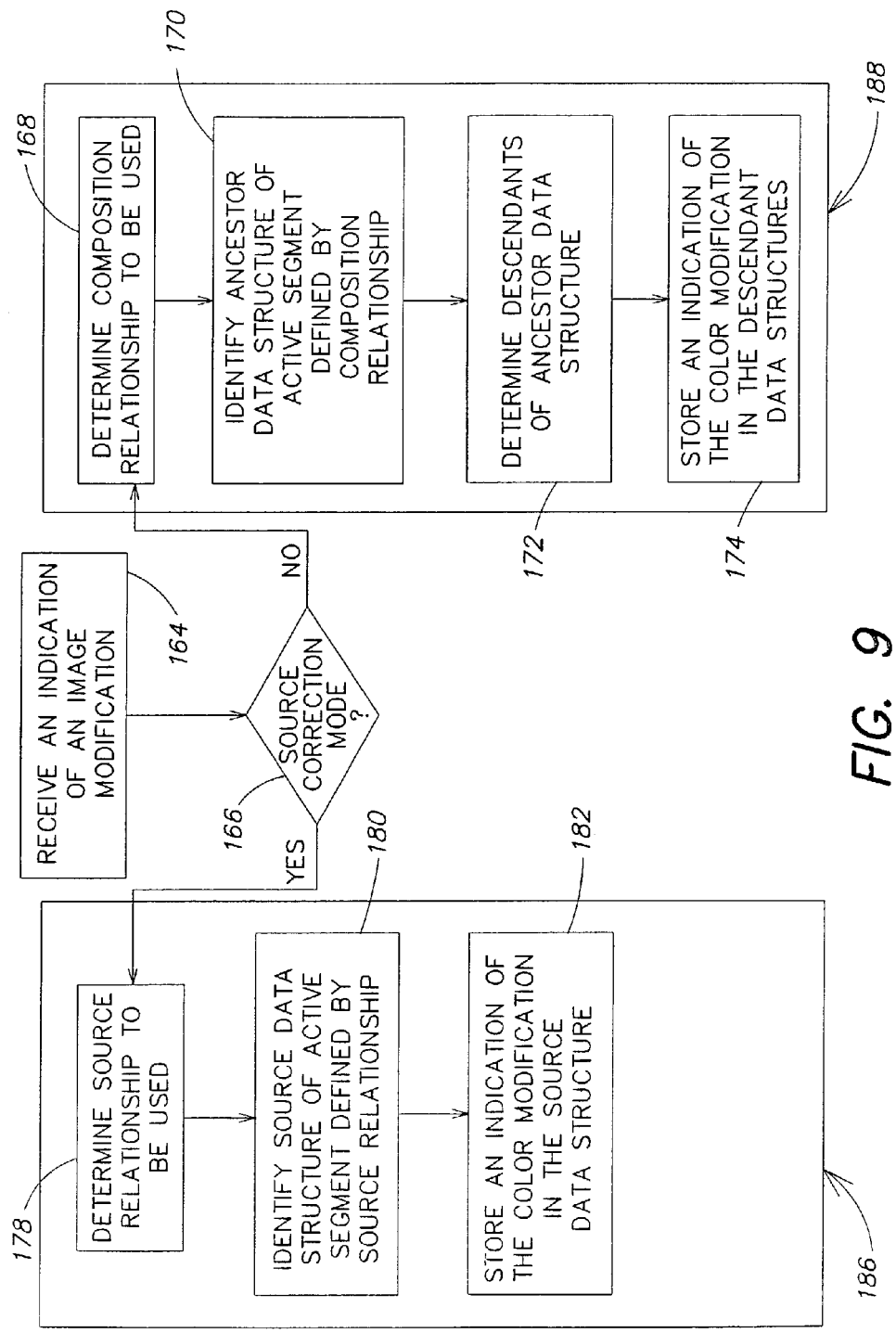

GRAPHICAL USER INTERFACE FOR COLOR CORRECTION

CROSS REFERENCE TO RELATED APPLICATION

This application claims the benefit under 35 U.S.C. 120 and is a divisional application of U.S. patent application Ser. No. 09/293,730, filed Apr. 16, 1999, now U.S. Pat. No. 6,847,373 which is hereby incorporated by reference.

BACKGROUND

Digital non-linear editing (DNLE) is a process by which digital media may be edited. DNLE, as the name implies, is performed on digital media stored as data in digital media files on a digital random access medium. DNLE may be conducted in a non-linear fashion because the digital media files in which the digital media is stored can be randomly accessed. Thus an editor may access a piece of the digital media without having to proceed sequentially through other pieces of the digital media stored in the same or other digital media files. More than one editor also may be able to access different pieces of the same digital media contemporaneously. The digital media may be a digitized version of a film or videotape or digital media produced through live capture onto a disk of a graphics or animation software application. Example commercial DNLE systems include the Media Composer® or the Avid® Symphony™ video production system or NewsCutter® news editing system available from Avid Technology, Inc. For a more detailed description of DNLE, see *Digital Nonlinear Editing, New Approaches to Editing Film and Video*, 1993, by Thomas Ohanian.

Color modification is a class of operations that may be performed both to correct color errors due to process errors and to adjust the colors used in the video for artistic expression. Such color modifications may include enhancing contrasts or color in an image to give a program an overall "look," or applying special effects to selected segments. Other color modifications may be made by an editor during an editing session to correct problems with color or lighting resulting from the source of the media. Such corrections may include color balancing for camera and lighting differences, correcting for film processing differences, matching colors and tones from shot to shot, or adjusting video levels for differences in source tapes, source decks, etc.

Digital images are comprised of an array of picture elements called pixels. For a given image, color modifications may be applied to all pixels in the image or pixels comprising a portion of the image. In digital video signal processing, a variety of data formats can be used to represent the color of pixels within a digital image. Formats may be classified into two major categories: composite signals and component signals. Component formats represent a color as multiple components, each component defining a value along a dimension of the color space in which the color being represented is defined. A composite video is an analog signal that uses a high frequency subcarrier to encode color information. The subcarrier is a sinewave of which the amplitude is modulated by the saturation of the color represented by the signal, and the hue of the color is encoded as a phase difference from a color burst. Analog composite signals generally are used to broadcast television video signals.

There are a variety of component formats used to represent color. RGB (Red, Green, Blue) format represents a color with a red component, a green component and a blue component. CMY (Cyan, Magenta, Yellow, Black) format represents a color with a cyan component, a magenta component, and a yellow component. CMY is a format commonly used by printers. The CMY components are color opposites of RGB components. In a three-dimensional coordinate system, each component of either the RGB or the CMY format represents a value along an axis, the combination of the values defining a cubic color space.

The data formats HSL (Hue, Saturation, Lightness or Luminance) and HSV (Hue, Saturation, Value) represent a color with a hue component, a saturation component, and a luma component. In a three-dimensional coordinate system, the luma component represents a value along a luma axis, the hue component represents the angle of a chroma vector with respect to the luma axis and the saturation component represents the magnitude of the chroma vector. The combination of the values defines a hexagonal cone-shaped color space around the luma axis.

YCrCb, YUV, and YIQ are three formats that represent a color with a luma component Y, and two chroma components, Cr and Cb, U and V, or I and Q, respectively, that define a chroma vector. In a three-dimensional coordinate system, each component of either the YCrCb, YUV, and YIQ format represents a value along an axis, the combination of the values defining a cylindrical color space around the luma axis. The chroma components define the chroma vector. In data formats with a luma component, the luma component can be used independently to represent a pixel in a black and white image to be displayed, for example, with a black and white monitor.

A typical color modification in HSL color space may include increasing a color component or a combination of color components for all pixels in each digital image of a section of digital media. Typically, an editor accesses a segment of a composition that represents the section of media through an editor interface and inputs desired color modifications through the editor interface. Some systems permit an editor to apply color modifications to only portions of a digital image. Portions of a digital image can also be described as one or more pixels. For example, an editor may select with a mouse, keyboard, or some other editor input device a portion of the image and define color modifications for the selected portion. A suitable commercial system for color modification is Avid Media Illusion™ available from Avid Technology, Inc. The Avid Media Illusion Reference Guide, available from Avid Technology, Inc. is herein incorporated by reference. Other commercial software applications may be used.

SUMMARY

One problem with correct techniques for color modification is that a color modification generally cannot be specified for several segments in a composition originating from a common source. An editor generally accesses every segment derived from a source individually to make the color modification. This process can be time-consuming and prone to error. An editor may intend on making the same modification to a first and second segment originating from a common source, but the modifications may be inconsistent. Different editors also may be working on the different segments of the same source. Although color matching from one segment to the other is one solution to this inconsistency, the other segment is not always available, and having to color match adds more time to the editing process.

Source color modification permits a color modification to be specified for several segments originating from a common source. Such source color modification may be combined with other color modifications made generally to a program or part of a program.

Accordingly, in one aspect, a method generates a representation of a color modification to be applied to segments on a digital nonlinear editing system, where each segment is a component of a media composition, and represents a section of a digital media. An indication of a modification to be applied to a color attribute of a segment is received, and the source from which the segment originates is identified. The indication of the color modification is then stored, and, as a result, the color modification is applied to other segments that originate from the identified source. In one embodiment, the color modification is stored in a source data structure that represents the source of the segment. In another embodiment, the color modification is stored in the other segments originating from the source.

In yet another embodiment, a source relationship attribute of the segment is accessed to identify the source. The source relationship attribute indicates a source of the segment, and is used to determine a common source from which the segment and other segments on the system originate. Consequently, the source of the first segment is identified in accordance with the source relationship attribute. In another embodiment, the source relationship attribute is received.

In yet another embodiment, the segment includes a source identifier that is accessed to determine the source of the segment.

In another aspect, a method applies color modification to a section of digital media on a digital nonlinear editing system. A media segment represents the section of a digital media. The segment is a component of a media composition, and originates from a source data structure. The source data structure also represents the section of the digital media. The section is received, and the first source data structure from which the segment originates is identified. It is determined whether the first source data structure includes a color modification attribute, where the color modification attribute defines a color modification to be applied to sections of the digital media represented by segments that originate from the source data structure. If the source data structure includes the color modification attribute, the color modification is applied to the section of media.

In another embodiment, it is determined whether the segment includes another color modification defined by the composition that to be applied to the section of the digital media represented by the segment. If the media composition includes the other color modification, the other color modification is applied to the first section of the digital media.

In another aspect, provided is method of performing natural color matching. An indication of a selected destination color component is received. The destination color having a first luminance and a source destination color component having a second luminance. A product of a ratio of the first and second luminance and the value of selected destination color component is determined. The values of the selected destination color component are adjusted according to the determined product.

BRIEF DESCRIPTION OF THE DRAWINGS

In the drawings,

FIG. 9 is a flow chart illustrating an embodiment of an editing process implementing composition color modification and a source color modification;

DETAILED DESCRIPTION

Figure 1:
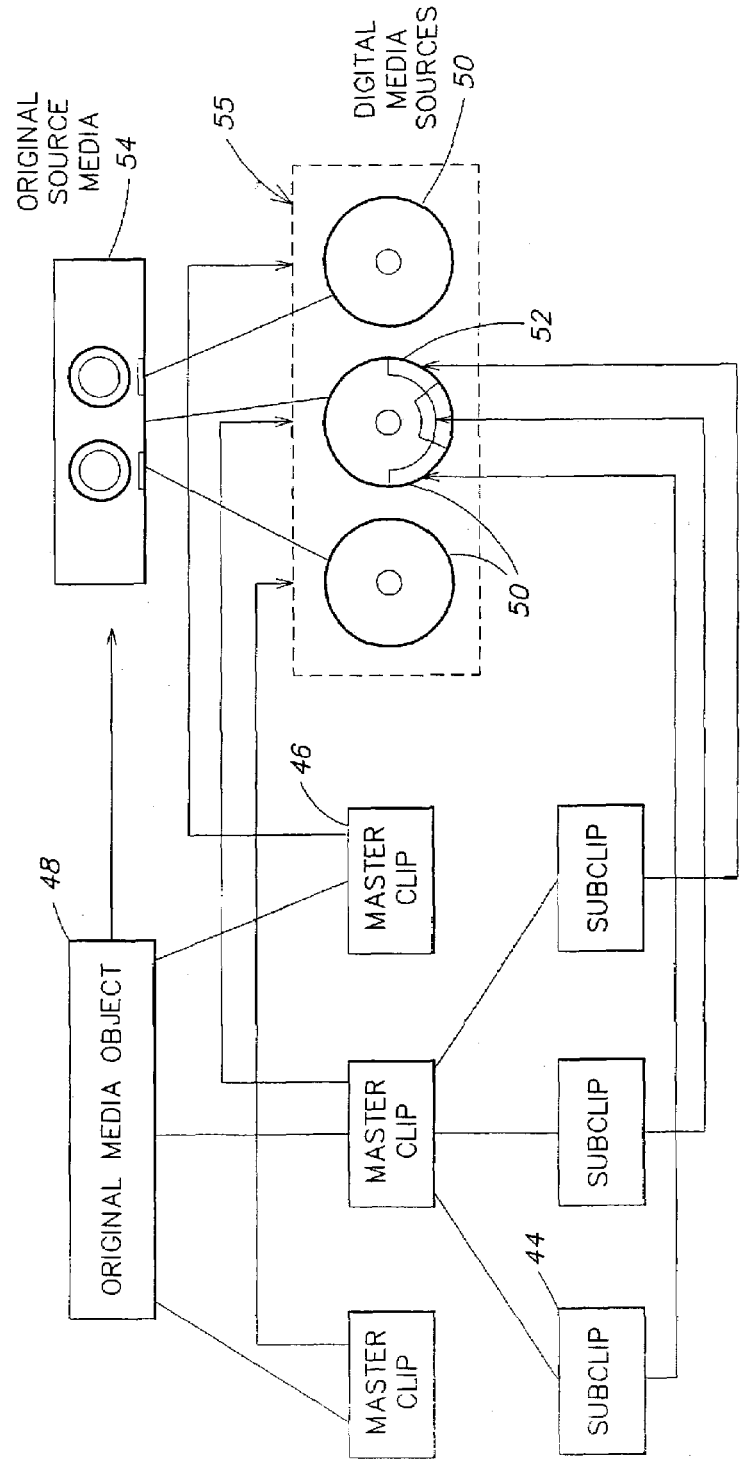
FIG. 1 is a block diagram illustrating relationships between source data structures and source media.

The following detailed description should be read in conjunction with the attached drawing in which similar reference numbers indicate similar structures. All references cited herein are hereby expressly incorporated by reference.

A DNLE may track or have access to information that indicates how segments of media in a composition may be related by the source of the media data that they represent. This information may be used to apply color modification to multiple segments at the same time. Such modification is referred to herein as source color modification.

The relationships between segments of a source media in a composition are represented by references to source data structures representing media that can be combined or composed into a multi-media composition. Color modifications, including source color modifications, are generally defined within the context of a composition. Compositions are represented by composition data structures or components. Data structures for source media and compositions are described in more detail below.

Relationships between segments of media in a composition, the data structures that represent these relationships, and the relationships between these data structures themselves are described in one or more U.S. patents, including U.S. Pat. No. 5,752,029 by Michael J. Wissner and issued May 12, 1998, entitled Method And Apparatus For Representing And Editing Multimedia Compositions Using References To Tracks In The Composition To Define Components Of The Composition (The Wissner patent), U.S. Pat. No. 5,267,351, filed on Dec. 22, 1989 by Stephen J. Reber et al. entitled MEDIA STORAGE AND RETRIEVAL SYSTEM (the Reber patent), U.S. Pat. No. 6,374,336, filed Apr. 3, 1998 by Eric C. Peters entitled Computer System And Process For Transferring Multiple High Bandwidth Streams Of Data Between Multiple Storage Units And Multiple Applications In A Scalable And Reliable Manner (the Peters patent), incorporated herein by reference. Source relationships and data structures also are described in the OMF Interchange® Specification (OMF), version 2.1, 1997, available from the OMF Developers' Desk of Avid Technologies, Inc., and available on the Internet at the URL:http://www.avid.com/3rdparty/omfi, and in the Advanced Authoring Format specification (AAF), herein incorporated by reference.

A general summary of such source relationships and data structures that may be used will now be described.

A DNLE system typically permits an editor to create a multimedia composition. A multimedia composition is collection of relationships between time-varying media data, representing how the data should be synchronized and combined over time. Time-varying data, may be, for example, video or audio data, but is not limited to such data. Static data that does not vary with time, for example, still pictures and text, is a subset of time-varying data, and may also be included in a multimedia composition. The data are related by grouping them into different types of components, the combination of which forms a composition. A method and apparatus for representing such a media composition is described in one or more U.S. patents, including the Wissner patent, incorporated herein by reference.

Media data used in a composition includes digitized versions of physical source media such as video or audio tape, compact disk, computer generated images, etc. Physical source media are also referred to herein as physical media. Digitized versions of physical media available for use are referred to herein as digital media sources or digital sources. Digital sources may include digital samples of physical media or may have been created from application software for graphics, animation, or word processing, etc. A digital source created by application software is referred to herein as a digitally created source. A digital source digitally sampled directly from a physical media is herein referred to as an original digital media source or an original digital source. A digital source may represent a single image or a single sample, and may be a copy of or a portion of another digital source. Digital sources are stored in digital media files.

Representations of digital sources and representations of physical media are referred to herein as source data structures. Source data structures may be stored in data files in a data base or any other format. A source data structure representing a digital source may be stored in the same media data file as the digital source it represents or in a separate data file.

A source data structure includes information describing the media, whether digital or physical, that it represents. The information may include: how the digital source was created; an identification of the corresponding physical media; the sample rate (and therefore the duration of a sample), and the length of each sample in bytes; an indication of the section of the physical media that it represents and the time offset from the source physical media of its first sample. The units of this offset is the sample duration for the digital source.

Multiple digital sources of the same physical media and their corresponding source data structures also may be stored if desired. Storing multiple digital sources and source data structures allows the composition to support the interchange of media at different levels of visual or audio quality for different purposes. For example, one digital source might have a level of quality which is suitable for output to video tape, whereas an alternative digital source might be useful for displaying in a small window on a computer screen. Examples of such a system for storing and accessing multiple digital sources of a single physical media are described in the Reber patent and the Peters application, incorporated herein by reference. A commercial storage system suitable for storing media data files and composition data includes the MediaShare® storage system available from Avid Technologies, Inc. Other commercial systems may be used.

A source data structure called a source clip represents a single time-contiguous section of media. As with other source data structures, a source clip does not include the actual media data of the digital source, but only references it, for example by referring to a data file. A source clip represents a digital source, which could be an original digital source or a digitally created digital source. A source clip that represents an original digital source or a digitally created source is referred to herein as a master source clip or a master clip. A source clip that represents a digital source that is a section or a copy of an original digital source or a digitally created source is herein referred to as a subclip. A source data structure that represents a physical media is herein referred to as a physical source media object or physical media object. Source clips are described in OMF and AAF, incorporated herein by reference.

A source clip may include a source identifier that identifies another source data structure that represent either a digital source or physical media that includes the section of media represented by the source clip. If the source clip represents a digitally created digital source, the source identifier is a null value because the digitally created digital source does not originate from another source. A source clip that does not represent a digitally created digital source also includes a source offset. The source offset identifies a starting position relative to the section of media represented by the source data structure from which the source clip originates.

If a first source data structure is referred to as originating from a second source data structure herein, the second source data structure is the source of the first source data structure. If a first source data structure is referred to as indirectly originating from a second source data structure herein, the second source data structure is the source of at least a third source data structure that is the source of the first source data structure. "At least" a third data structure means that there may be multiple source data structures between the first and second source data structures, each data structure originating from the other in a source chain between the first and second source data structures. For example, a subclip may indirectly originate from a physical media object, as described below in connection with FIG. 1.

An example illustration of offset is a source clip that has an offset of 40 units and represents an original digital source. The source clip thus originates from a data structure that represents a physical media, as discussed in more detail below. If the data structure from which the source clip originates includes an offset of 100 and represents units 100–200 of a physical source, the 40 units defined by the source clip are offset from unit 100 of the physical source.

The source thus represents a section of media beginning at unit 40 of the digital source, and which ends at unit 140 of the physical media.

A source data structure to which a source clip refers also may refer to another source data structure, which also may refer to yet another source data structure, etc. This type of multiple layering is described in the Wissner patent and by OMF, herein incorporated by reference.

An example embodiment of such a multilayered representation is illustrated in FIG. 1. The physical media object 48 is a source data structure that presents the physical source media 54 from which original digital media sources 50 are created. Each original digital source 50 may be stored in digital media file as described in the Reber patent. Each original digital source 50 is a digitized portion of the physical media 54, where any of the original digital sources 55 could be a digitization of the entire physical media 54. For each original digital source 50 created from the physical media 54, a master source clip 46 that represents the original digital source is also created.

Other digital sources such as 52 may be specified as sections of the original digital sources 50. Alternatively, other digital sources may be created as copies of an original digital source 5. For each other digital source 52 created, subclips 44 are created to represent the digital source 52. Each subclip 44 originates from a master clip 46 which may originate from a physical media object 48. Consequently, each subclip 44 may indirectly originate from a physical media object 48.

In order to support the editing of compositions of a variety of media, composition data structures are used for organizing and storing information concerning a composition and operations manipulating those composition data structures. The basic building blocks of a composition are called components. A composition is structured as a tree of components including a root component. A component may or may not have subcomponents, depending on its type. A component may be considered a function over time because it includes information for producing the state of its portion of the composition at any time within its range. A component thus represents a time-dependent sequence of media data or sources called a media stream.

The composition data structures used for representing the components of a composition exclude the media data itself. The composition data structures include indications of or references to the media data and representations of the relationships between and combinations of the media data which form the composition. Thus, compositions are stored separately from the media data to which they refer, and allow many compositions to use the same media data without duplicating it.

Figure 2:
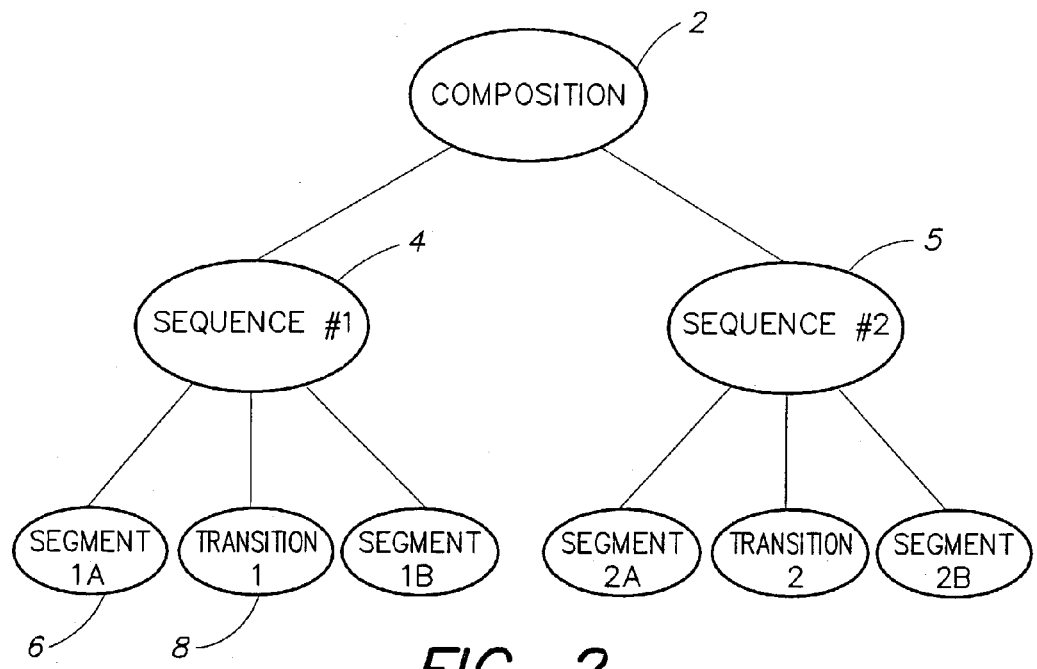
FIG. 2 is a diagram illustrating relationships between composition data structures in a composition.

Several types of data structures may be combined to form a composition. FIG. 2 illustrates one possible combination of components. Each segment 6 represents a section of media as a component of a composition. Although each segment also may represent more complex structures such as a sequence or a track group, which is discussed further below, a segment as referred to herein represents a single time-contiguous section of media in the context of a composition, unless otherwise specified. A segment includes a source identifier that identifies a source clip.

Transitions 8 are components which are located between two segments in a sequence of components, and indicate how a presentation should transition from displaying one segment to displaying the next segment.

A sequence 4 represents the serialization or concatenation in time of a collection of components. A sequence may define an ordered list of segments separated by transitions, and may itself be a segment within another sequence. The order of segments in a sequence defines the order of interpretation or "playback." Each sequence 4 may include a list of subcomponents and includes the subcomponent identifier of each subcomponent. An example of a playback system suitable for playing a composition is described in the Wissner Patent and U.S. Pat. No. 6,374,336 (Peters patent) and U.S. Pat. No. 5,045,940, filed Dec. 22, 1989 by Eric C. Peters entitled VIDEO/AUDIO TRANSMISSION SYSTEM AND METHOD (the Peters patent), incorporated herein by reference. Also, a commercial playback system may be used for playing compositions that implements the Media Engine video playback system available from Avid Technology, Inc. that is incorporated in the Avid® AirPlay® MP playback server system. Media Composer from Avid Technology, Inc is a suitable commercial system for playback as well as editing. Other commercial systems may be used.

A track group defines a parallel relationship between sequences or segments, which are defined by tracks within the track group. For example, one track within a track group may be an audio sequence or segment to be synchronized with a video sequence. Another track within the track group may be the video segment or sequence, and a third track within a track group may be a background video effect segment or sequence to be combined with the video segment or sequence. A composition is essentially a track group wherein the parallel tracks begin at a same point in time and end at a same point in time.

Figure 3:
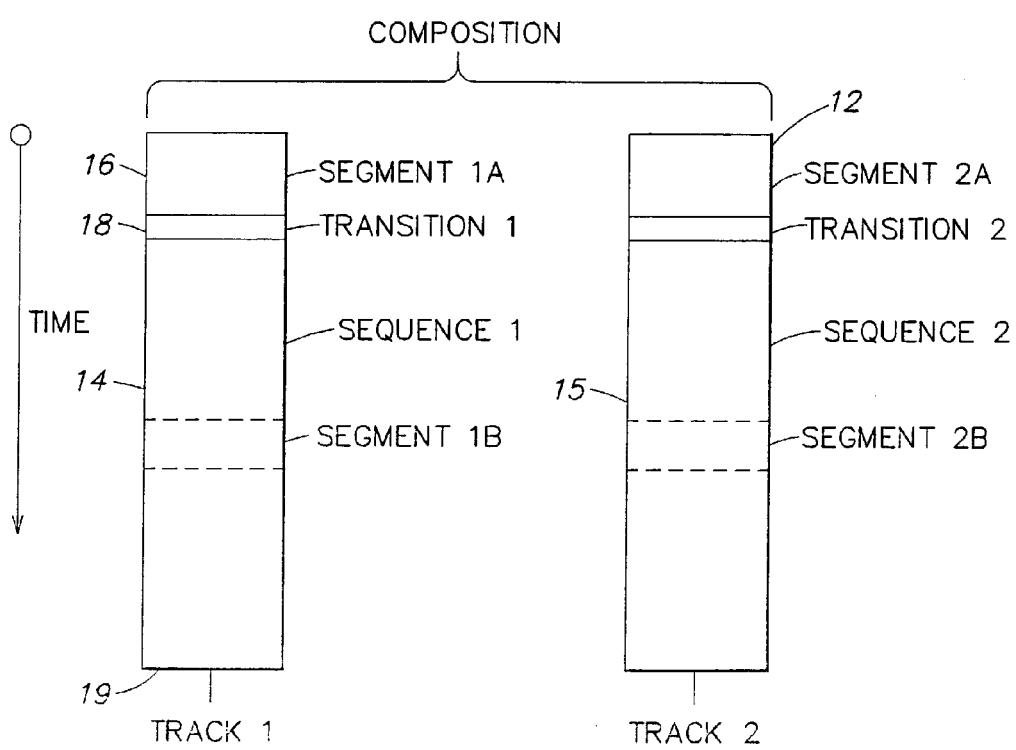
FIG. 3 is a diagram illustrating parallel and serial relationships between the composition data structures of FIG. 2.

FIG. 3 illustrates a representation of a composition 2, wherein sequences 4 and 5 (FIG. 2) are represented by parallel tracks 14 and 15, respectively. "Segment 1A" and "Segment 1B" in FIG. 2 correspond to segments 16 and 19 in FIG. 3. "Transition 1" (8 in FIG. 2) corresponds to transition 18 in FIG. 3. Each track 14 and 15 may be considered a logical player channel, and therefore is of a single media type. Because tracks 14 and 15 are subcomponents of a composition 2, the sequences 4 and 5 start at the same point in time and end at the same point in time.

Figure 4:
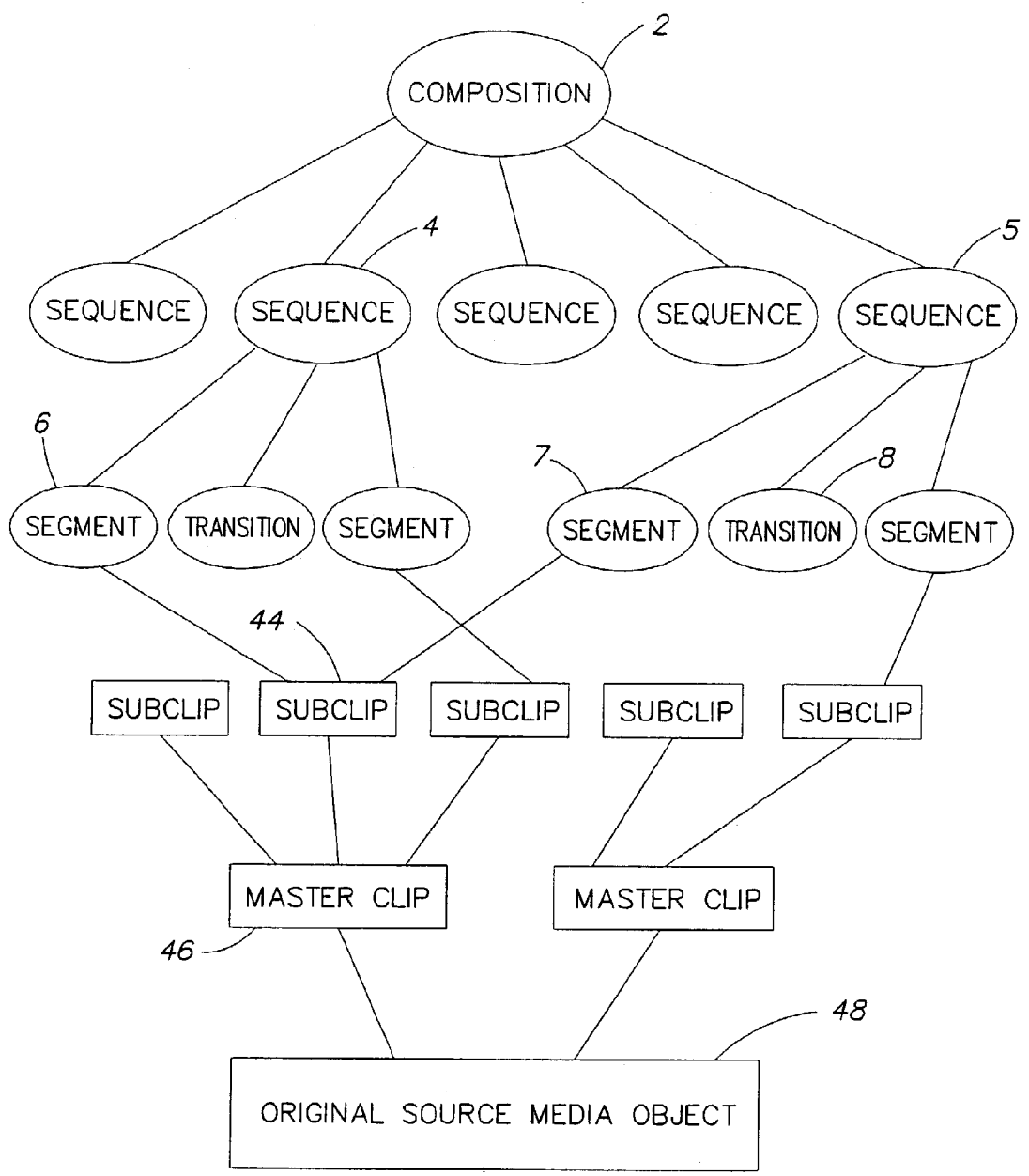
FIG. 4 is a diagram illustrating relationships between the source data structures of FIG. 2 and the composition data structures of FIG. 3.

FIG. 4 illustrates the relationship between source data structures and a media composition. The composition 2 includes 5 tracks, where each track is a sequence, including a sequence 4 that includes several segments and transitions. Sequence 4 includes a segment 6 that originates from a subclip 44. The subclip 44 originates from master clip 46 that originates from the physical media object 48. Source clip 44 is the source of segment 7 as well as segment 6. Segment 7 is a subcomponent of sequence 5. Thus, the subclip 44 is the source of two segments 6 and 7 which belong to two different sequences 4 and 5, respectively. Although not shown in FIG. 4, the subclip 44 could be the source of a segment used in an entirely different composition. The same kind of relationship between source data structures and composition data structures can be true at the master clip level also. A master source clip or a physical media object can be the source of multiple subclips linked to segments of multiple compositions.

Having now described the various kinds of source relationships and an embodiment of the data structures representing these relationships and how they are used to define a composition, an embodiment of source color modification will now be described.

Source color modification provides a simple, time-saving method of applying a single color modification to several segments originating from a common source. The common source may be defined by a relationship source relationship attribute that may be defined by an editor.

Figure 5:
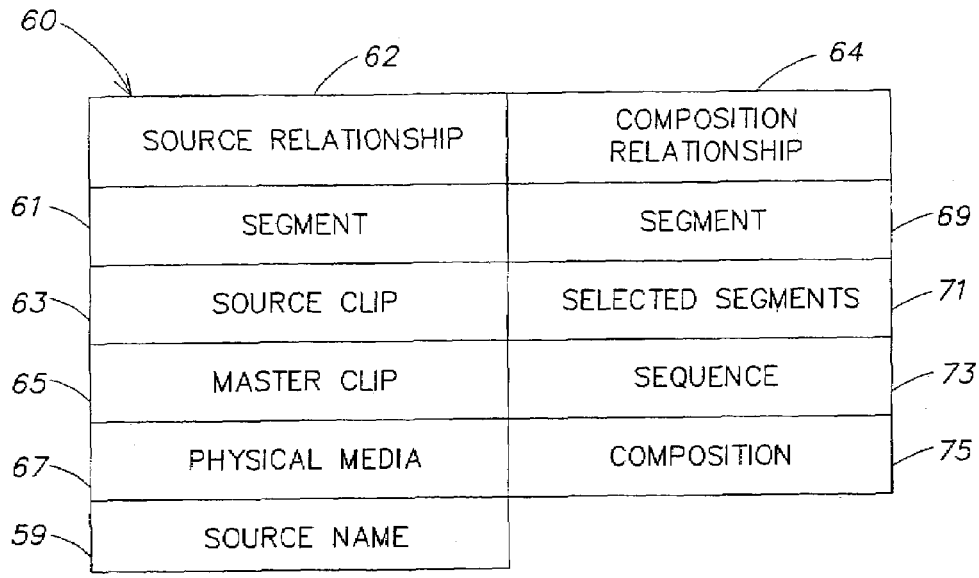
FIG. 5 is a table illustrating an embodiment of a relationship.

FIG. 5 illustrates a table 60 that lists possible source relationships for source color modification and possible composition relationships for composition color modification, which will be discussed in more detail below. The table 60 includes a source relationship column 62 and a composition relationship column 64.

The source relationship attribute can be defined as a segment relationship 61, a source clip relationship 63, a master clip relationship 65 or an physical media relationship 67. If the source relationship is defined as the segment relationship 61, the color modification is applied only to the active segment during playback. An active segment, as used herein, means either the segment currently being edited on an editing system or a segment currently being played on a playback system. If the source relationship is defined as the source clip relationship 61, during playback the color modification is applied to any segment, used within any composition on the system, that originates from the same source clip as the active segment. If the source relationship attribute is defined as a master clip relationship, during playback the color modification is applied to any segment that directly or indirectly originates from the same master clip from which the active segment indirectly originates. If the source relationship attribute is defined to be the physical media relationship, the color modification is applied to any segment that indirectly originates from the same physical media object from which the active segment indirectly originates.

For example, an editor may define the source relationship to be a source clip relationship. If an editor notices that a segment representing film footage is too dark, the editor can increase the luminance of the segment to therefore brighten the image. During playback, the modification increase in luminance may be applied to any segment originating from the source clip.

Composition color modification provides a method for an editor to apply a single color modification to several segments within a composition. A composition relationship attribute defines the ancestor of the active segment that is used to determine a common ancestor to which all descendants in the composition have in the composition structure color modification applied during playback.

Figure 6:
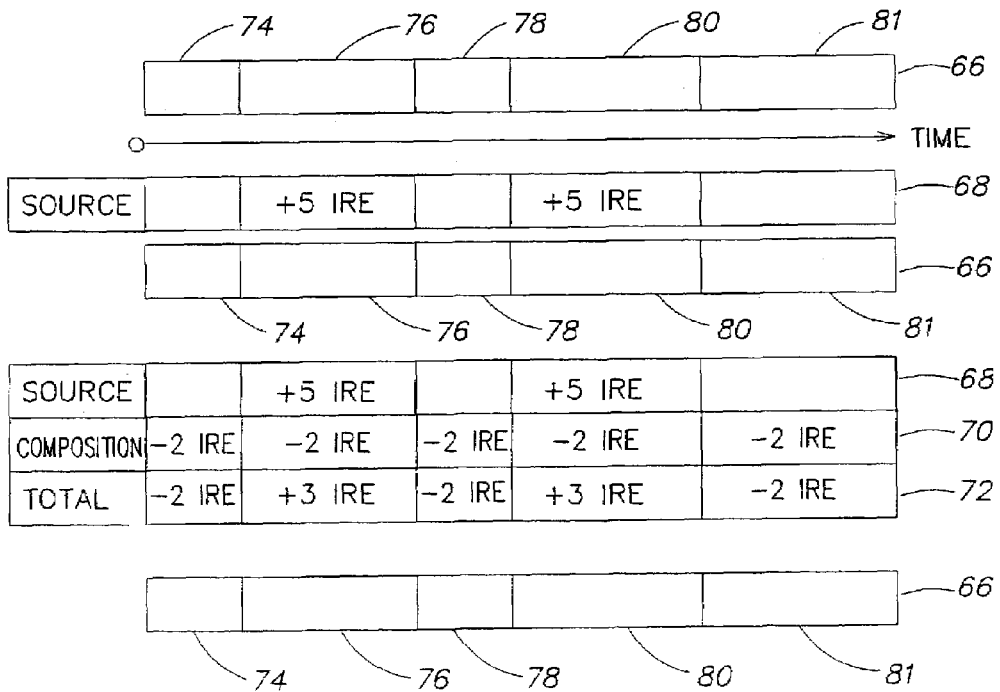
FIG. 6 is a block diagram illustrating an embodiment of effects of source color modification and composition color modification on segments within a sequence.

Referring to the table 60 of FIG. 6, the composition relationship attribute may be defined to be a segment relationship 69, a selected segments relationship 71, a sequence relationship 73, or a composition relationship 75. If the composition relationship attribute is defined to be the segment relationship 69, only the active segment has the color modification applied during playback. If the composition relationship attribute is defined to be the selected segments relationship 71, only the selected segments have the color modification applied during playback. If the composition relationship attribute is defined to be the sequence relationship 73, all segments descended from or included in that sequence have the color modification applied during playback. If the composition relationship attribute is the composition relationship 75, all segments of the composition have the color modification applied during playback.

The combination of composition color modification and source color modification applied to a single segment will be described with reference to FIG. 6. Suppose that various footage has been shot by a film crew to be used in a movie. Included in this footage is some from scene A, footage from another scene B, footage from another scene C, and footage from yet another scene D. The film editors decide to use digital non-linear editing to combine the footage, make color modifications, and add special effects, etc. to produce the finished movie.

First, the editors create original digital sources from the film footage. Thus, an original digital source A, an original digital source B, an original digital source C, and an original digital source D are created. As discussed above, for each digital source created, a master source clip that represents the digital source is created also. Thus, a master source clip A, a master source clip B, a master source clip C and a master source clip D are created.

The editors then decide that the footage of scene B can be divided into two separate shots: shot 1 and shot 2. Thus, from the original digital source B, a digital source of shot 1 and a digital source of shot 2 are created. In response to the creation of the two new digital sources, a subclip of shot 2 is created to represent the digital source of shot 2, and a subclip of shot 1 is created to represent the digital source of shot 1.

The editors then decide to combine the footage of the various scenes together. Using a digital non-linear editor, the editors create a composition that includes a sequence 66 that includes a segment 74 originating the master clip A, a segment 76 that originates from the subclip of shot 2, a segment 78 that originates from the master clip C, a segment 80 that originates from the subclip of shot 1, and a segment 82 that originates from the master clip D.

While viewing the various segments in the video display, an editors may notice that the segment of shot 2 is too dark. The editors may decide to make a color modification to increase the luminance of this segment.

Using source color modification, the editors define the master clip relationship as the source relationship attribute. The editors then increase the luminance of the segment of shot 2 by 5 IRE. Because the source relationship attribute was set to master clip relationship, upon playback both the segment of shot 2 and segment of shot 1, which both indirectly originate from the master clip B, have luminance increased by 5 IRE as shown in item 68 of FIG. 6.

The editor may then realize that all the segments of the sequence 66 are too bright. The editor may set the composition relationship attribute to a sequence relationship. The editor may then decrease the luminance of the active segment by 2 IRE. Because the composition relationship attribute is defined as a sequence relationship, all segments within the sequence 66 have their luminance decreased by two IRE during playback, as shown by row 70 in FIG. 7. Row 72 shows the combined color modification of both the composition color modification and the source color modification that is applied to each segment within the sequence 66 during playback.

Figure 7:
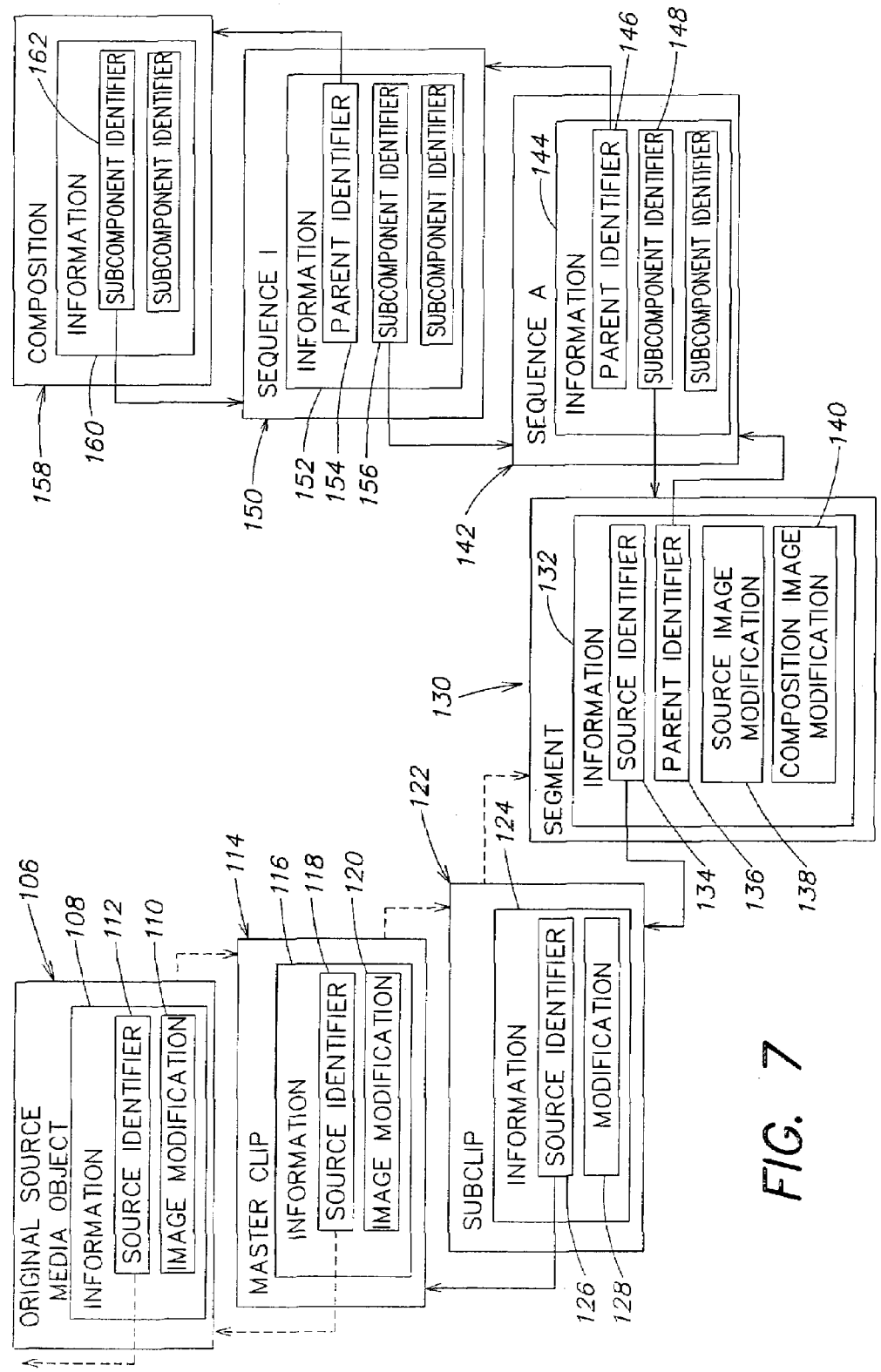
FIG. 7 is a block diagram illustrating an embodiment of source data structures and composition data structures.

FIG. 7 illustrates an embodiment of source and composition data structures that can be used for source and composition color modification. A segment 130 includes information 132 about the section of media that the segment 130 represents. This information may include a source identifier 132, a parent identifier 134, a source color modification attribute 138, and a composition color modification attribute 140. The source and composition color modification attributes 138 and 140 may themselves be partitioned into a plurality of color modification attributes.

The source identifier 134 identifies the source data structure from which the segment 130 originates. The parent identifier 136 identifies the parent of the segment in a composition 158. The source color modification attribute 138 represents a source color modification to be applied to the segment 130 during playback. The composition color modification attribute 140 defines a composition color modification to be applied to the section of media represented by the segment 130 during playback. It should be noted that if a source or color modification is not defined for a data structure, a color modification attribute may be a null value, or the color modification attribute may not be included in a data structure.

In FIG. 7, the source identifier 134 points to a subclip data structure 122. The subclip data structure 122 includes information 124 about the section of media that the subclip represents. The information 124 includes a source identifier 126 and may include a source color modification attribute 128, depending upon whether the source color modification was defined for the subclip 122 during an editing session. The source identifier 126 of the subclip 122 refers to a master clip data structure 114. The master clip 114 includes information 116 about the digital media that the master clip 114 represents. The information 116 may include a source identifier 118 and may include a color modification attribute 120. If the master clip 114 represents a digitally created digital source, the source identifier 118 may be a null value indicating that the master clip does not originate from another source.

The source identifier 118 of the master clip 114 may refer to a physical media object 106. The physical media object 106 includes information 108 that describes the physical media that the physical media object 106 represents. The information 108 may include a source identifier 112 and may include a color modification attribute 110. The information 108 includes a source identifier 112 if the physical media that the physical media object represents was created from another physical media. For example, the physical media may be a video tape that was created from a film through a telecine process. The source identifier 112 refers to the physical media object that represents the film.

In the example of FIG. 7, the parent identifier 134 of the segment data structure 130 refers to a first sequence data structure 142. The first sequence 142 includes information 144 about the first sequence 142. The first sequence information 144 may include a parent identifier 146 and includes a subcomponent identifier 148. The first sequence information 144 would not include a parent identifier 146 if the sequence 142 is itself a composition, which is not shown in FIG. 8. The first sequence information 144 may include an ordered list of subcomponents of the first sequence 142, where the order of the subcomponents determines the order in which the subcomponents are played during playback. For each subcomponent, the information 144 may include a subcomponent identifier 148.

In the illustration of FIG. 7, the subcomponent identifier 148 identifies segment 130. The parent identifier 146 identifies a second sequence 150 of which the first sequence 142 is a subcomponent. The second sequence 150 includes information 152 about the sequence 150. The second sequence information 152 includes information analogous to that described for a second sequence information 152 includes a parent identifier 154 that refers to the composition data structure 158. The second sequence information 152 would not include a parent identifier 154 if the second sequence 150 is itself a composition which is not shown in FIG. 8. The information 152 also includes an ordered list of subcomponents, the order of the subcomponents determining the order of playback of the subcomponents during playback. For each subcomponent, the information 152 includes a subcomponent identifier 156. The subcomponent identifier 156 identifies first sequence 142 as a subcomponent of second sequence 150. The parent identifier 154 identifies the composition 158 as the parent of sequence 150.

Composition 158 includes information 160 about the composition 158. The composition information 160 includes the sequences of each track of the composition, wherein the sequences are subcomponents of the composition 158. For each subcomponent of the composition 158, the information 162 includes a subcomponent identifier 162. The subcomponent identifier 162 identifies sequence 150 as a subcomponent of composition 158.

Figure 8A:
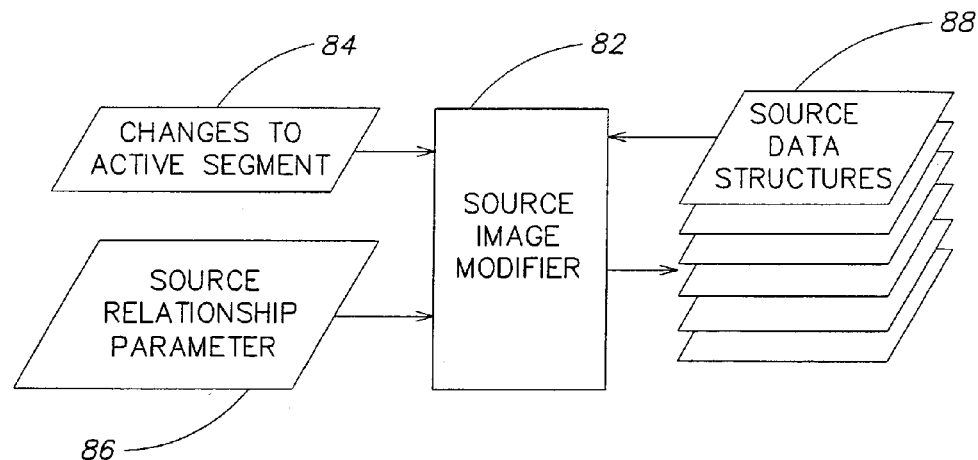
FIG. 8a is a data flow diagram illustrating an embodiment of a source color modifier.

FIG. 8A is a dataflow diagram that illustrates how the source data structures illustrated in FIG. 7 can be used to implement source color modification during an editing session. a source color modifier 82 receives user defined color modifications to an active segment 84 and a source relationship attribute 86. Using the color modification 84 and the attribute 86, the source color modifier 82 accesses the source data structures 88 and modifies the source data structures 88 in accordance with the color modification 84 and the attribute 86.

FIG. 9 is a flowchart illustrating an editing process implementing source color modification 186 and composition color modification 188. With reference to FIG. 9, the implementation of source color modification 186 by the source color modifier 82 during an editing session will now be described. First, in step 164, an indication of a color modification is received. Next, in step 166, an editor may determine whether the color modification is a source color modification or a composition color modification. Such a determination is made, for example, by accessing an indication of the color modification mode selected by an editor. If it is determined that source color modification shall be applied, at the next step 178, the source color modifier determines the source relationship to be used to determine a common source of the active segment and other segments on the system. Determining the source relationship to be used can be accomplished by either accessing a default source relationship attribute or by receiving a source relationship attribute defined by an editor.

Figure 10:
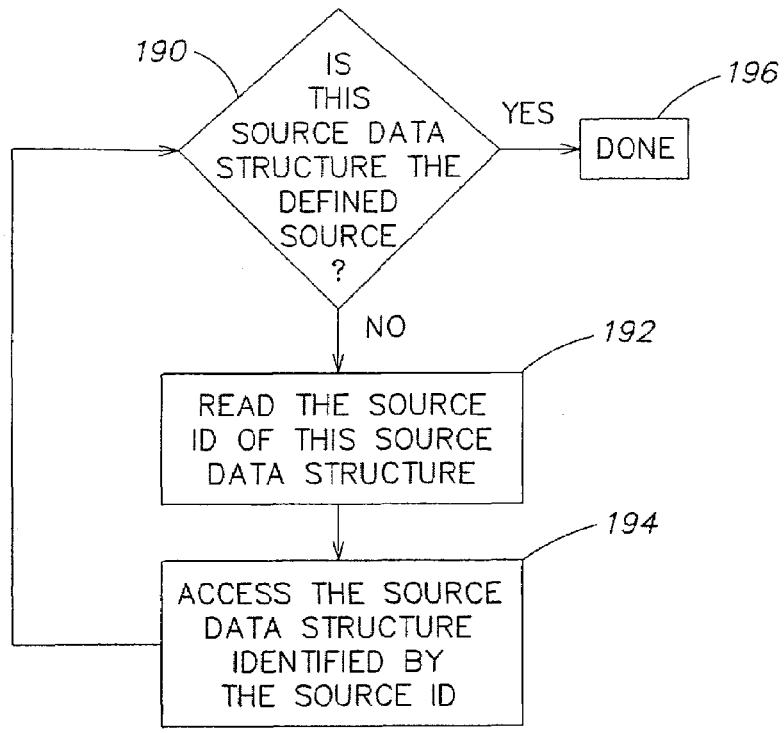
FIG. 10 is a flow chart illustrating an embodiment of a process of identifying a source data structure defined by a source relationship attribute.

Next, in step 180, the source color modifier identifies a source data structure of the active segment defined by the source relationship. FIG. 10 is a flowchart that defines in more detail the step 180 of identifying the source data structure. First, in step 190, the source color modifier 82 determines whether the current source data structure is the source data structure defined by the source relationship. The first time through the loop defined by steps 190–194, the current source data structure is the active segment. If the current source data structure is the defined source data structure, then the step of identifying the source data structure of the active segment is done, as illustrated in step 196. If the current source data structure is not the defined source data structure, in the next step 192, then the source color modifier 82 reads the source identifier of the current source data structure. In step 194, the source color modifier then accesses the source data structure identified by the source identifier. Steps 190–194 are repeated until the source data structure defined by the source relationship attribute is identified.

Returning to the flowchart of FIG. 9, in the next step 182, the source color modifier stores an indication of the source color modification in the source data structure identified in step 180.

In an alternative embodiment of source color modification, color modifications may be stored as an entry of a composition source table, as opposed to being stored in a source data structure. Each entry in the composition source table include two pieces of data: the identification of a source data structure for which a source color modification of a segment within the composition is defined, and an attribute representing the source color modification. Each time a source color modification is defined for a segment within the composition, an entry may be stored in the source table identifying the source data structure from which the segment originates, which is identified by the source relationship attribute, and the attribute representing the color modification.

The composition source table allows a source color modification to be shielded from other compositions on the system that use material from the defined source. The source modification may be defined specifically for segments of the same composition that originate from a common source, but not for all segments on the system originating from the common source. Thus, other editors are not forced to implement color modifcations on the composition that they are editing that may have been defined by a different editor working on a different composition.

Another benefit of using the source composition table is that it provides an editor with the option of not applying a source modification to the composition. An editor may select whether the composition source table is to be activated. For example, if a colorist defines a series of source color modifications for a composition, the source data structures and the modifications are stored in entries of the composition source table as described above. At a later point in time, an editor may access the composition, but not activate the table, and thus not apply the modifications defined therein.

For an active segment during playback, the color modification system may first determine if there is a source color modification defined for the active segment data structure. If a color modificaton is defined for segment data structure, the modification may be applied. If no modification is defined in the active segment data structure, the composition source table may be accessed. If it is determined that there is an entry for the subclip from which the active segment originates, the source color modification defined for the subclip is applied to the active segment. If it is determined that no entry for the subclip is present in the table, it is determined whether the table includes an entry for the master clip from which the segment originates. If it is determined that there is an entry for the master clip from which the active segment originates, the source color modification defined for the master clip is applied to the active segment. If it is determined that no entry for the master clip is present in the table, it is determined whether the table includes an entry for the physical media object from which the segment originates. If it is determined that there is an entry for the physical media object from which the active segment originates, the source color modification defined for the physical media object is applied to the active segment.

Figure 8B:
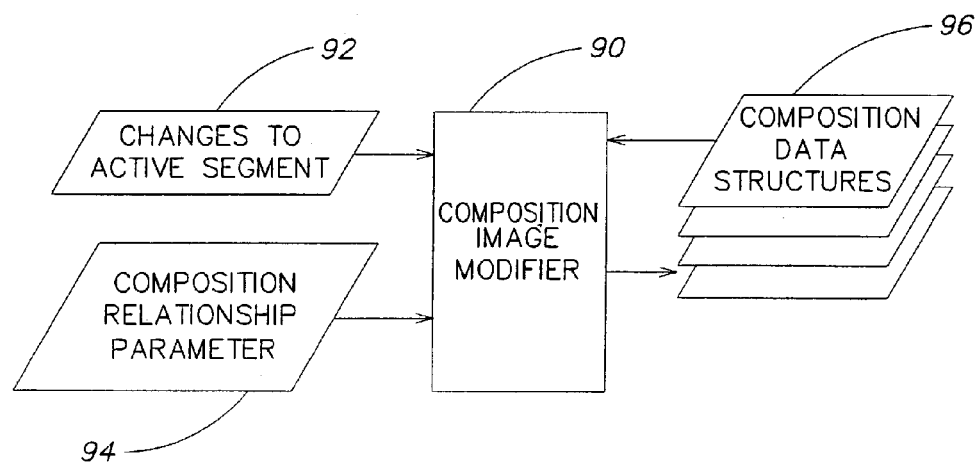
FIG. 8b is a data flow diagram illustrating an embodiment of a composition color modifier.

FIG. 8B is a dataflow diagram illustrating how composition color modification can be implemented by a composition color modifier 90. The composition color modifier 90 receives color modifications 92 to be applied to the active segment. The composition color modifier 90 then accesses a default relationship attribute or receives a composition relationship attribute 94 defined by an editor. The composition color modifier then accesses the composition data structures 96 and modifies the composition data structures 96 in accordance with the color modification 92 and the relationship attribute.

Referring again to FIG. 9, an implementation of composition color modification implemented by the composition color modifier 90 will now be described. As described above with respect to source color modification, the first step is step 164 of receiving an indication of a color modification. The digital media editing system then determines whether source color modification or composition color modification is to be applied in step 166.

If composition color modification is to be applied, in the next step 168, the composition color modifier determines the composition relationship to be used. The composition relationship is defined by either a default composition relationship attribute or a composition relationship attribute defined by an editor.

In the next step 170, the composition color modifier identifies the ancestor data structure of the active segment defined by the composition relationship attribute.

Figure 11:
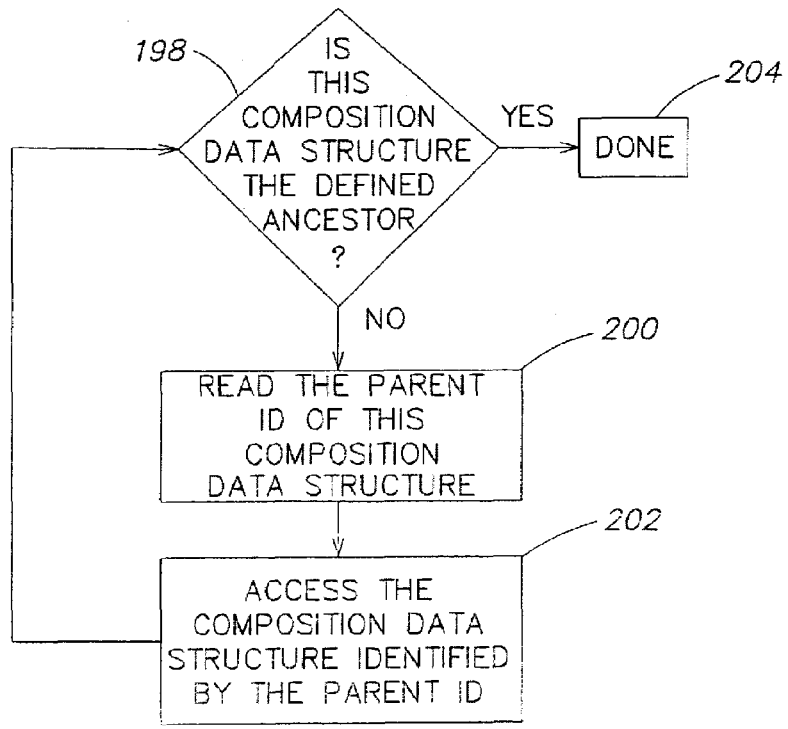
FIG. 11 is a flow chart illustrating an embodiment of a process of identifying a composition data structure defined by a composition relationship attribute.

FIG. 11 provides a more detailed flowchart of step 170. First, in step 190, the composition color modifier determines whether the current composition data structure is the ancestor data structure defined by the composition relationship attribute. The first time through the loop defined by steps 198–202, the current composition data structure is the active segment. If the current composition data structure is the defined ancestor data structure, then the step 170 of identifying the ancestor data structure is done, as illustrated in step 204. If the current composition data structure is not the defined ancestor, the next step 200 reads the parent identifier of the current composition data structure. In the next step 202, the composition color modifier accesses the composition data structure identified by the parent identifier. Steps 198–202 are then repeated until the ancestor data structure defined by the composition relationship attribute is identified.

Returning to FIG. 9, in the step 172, the composition color modifier determines the descendants of the identified ancestor data structure, for example, by accessing the subcomponent list of the identified data structure and accessing the subcomponent identifiers for each subcomponent, and traversing downward in the composition from the identified ancestor data structure. In step 174, for each identified descendant or subcomponent of the identified ancestor data structure, an indication of the color modification is stored in a descendant data structure. Traversing a composition to perform editing operations on components is described in the Wissner patent.

Figure 12:
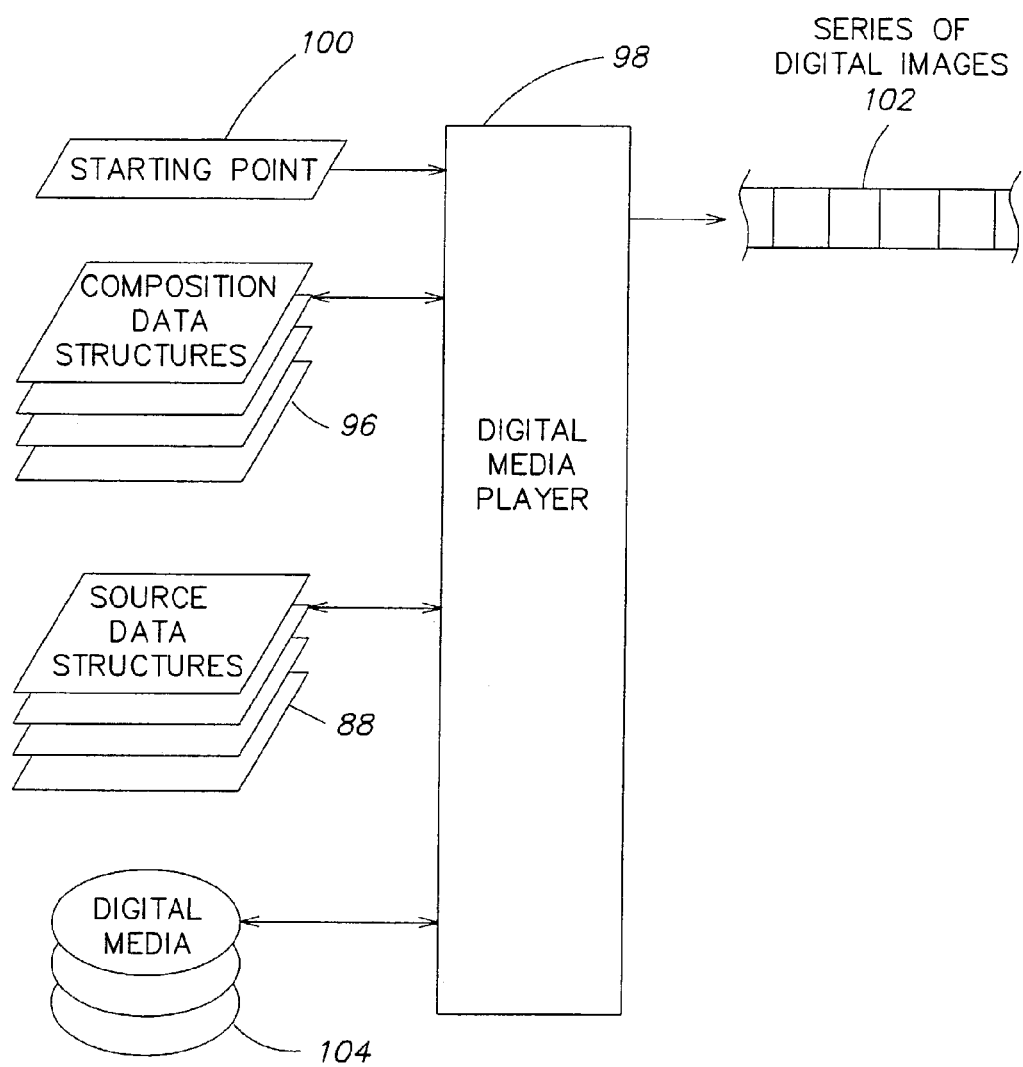
FIG. 12 is a data flow diagram illustrating an embodiment of a media player implementing source color modification and composition color modification.

Another aspect of source and composition color modification is the application of the color modifications to segments within a composition during playback. FIG. 12 is a dataflow diagram that illustrates an implementation of source and composition color modification during playback. A digital media player 98 receives an indication of a starting point 100 within a composition. The starting point 100 may be the beginning of the composition by default or may be defined by input from an editor on a user interface. The digital media player 98 accesses composition data structures 96 to properly synchronize the playing of sections of a digital media. For each segment identified within the composition, the digital media player identifies source data structures 88 from which the active segment originates, and determine whether any source color modification attributes are defined for these source data structures 88. The digital media player also uses the source data structures 88 to determine the digital sources from which the digital media should be accessed. The digital media player also determines whether the active segment has a composition color modification. The digital media player then applies the source color modification and the composition color modification to the active segment. This process is repeated for every segment of the composition, or every segment included in a portion of the composition selected by the user, such that a sequence of digital images 102 is produced as defined by the composition. A playback system may apply color modification sequentially on a segment, one digital image at a time. More specifically, a playback system may apply color modification sequentially on an digital image. Such a system is described in a U.S. Pat. No. 6,417,891, filed Apr. 16, 1999 by Cacciatore et al (the Cacciatore patent).

FIG. 13 is a flowchart that illustrates an implementation of source and composition color modification during playback. In step 206, the digital media player 98 accesses the next segment in a composition. Next, in step 208, the digital media player 98 determines whether a source color modification attribute is defined for this data structure. If there is a source color modification attribute defined for this data structure, the digital media player determines whether there is a temporarily stored source color modification attribute for this active segment.

It should be noted that the first time through the loop defined by steps 208–216, the source data structure is the active segment. For this reason, the first time through the loop defined by steps 208–216, at step 210 there is not a temporarily stored color modification attribute for the active segment. Alternatively, for the first time through the loop defined by steps 208–216, step 210 may be skipped. The data structure that holds the temporarily stored source color modification attribute for the active segment also may be initialized between steps 206 and 208.

Returning to the flowchart of FIG. 13, if there is not a temporarily stored source color modification attribute, in step 212 the digital media player temporarily stores the source color modification attribute for the active segment. If the digital media player determines in step 210 that there is already a temporarily stored source color modification attribute for the active segment or determines in step 208 that there is not a color modification attribute defined for this data structure, the digital media player proceeds to step 214. In step 214, the digital media player determines whether there is a source data structure from which the current source data structure originates.

If the media player determines that there is a source data structure from which the current source data structure originates, the media player proceeds to step 216. In step 216, the media player accesses the source data structure from which the current source data structure originates. Steps 208–216 are repeated until there is not a source data structure from which the current source data structure originates.

If there is not a source data structure from which the current source data structure originates, the digital media player proceeds to step 218. In step 218, the digital media player determines whether there is a temporarily stored source color modification attribute for the active segment. If there is a temporarily stored source color modification for this segment, the digital media player in step 220 applies the temporarily stored source color modification attribute to the active segment.

After applying the temporarily stored source color modification attribute to the active segment, or after determining that there is not a temporarily stored source color modification attribute for this segment, the digital media player proceeds to step 222. In step 222, the digital media player determines whether there is a composition color modification defined for the active segment. If there is a composition color modification defined for this segment, the digital media player proceeds to step 224 where it applies the composition color modification to the active segment.

After applying the composition color modification to the active segment or after determining that there is not a composition color modification to find for this active segment, the digital media player then proceeds to step 206 where it accesses the next segment in the composition. Steps 206–224 are repeated until the entire composition or the portion of the composition defined by a user has been played.

FIG. 14 is an example embodiment of a user interface 400 for color modification. A three-image display 270 includes a current image display 229, a previous image display 228, and a next image display 230. The current image display 229 represents an active segment of a sequence, and the previous image display 228 and the next image display 230 represent the previous and next segments of the sequence, respectively. A control panel, for example the control panel 272 of the current image 229, may be associated with each image display. For the current image display, for example, the control panel may include a previous segment button 232, a next segment button 234, a previous unmodified segment button 236, a next unmodified segment button 238, a play button 240, and a stop button 242. Each image may also include a scroll bar, for example scroll bar 261 of the current image 229. Each scroll bar may include a position indicator 262 which indicates the temporal position of the current image 229 within the segment that it represents.

The three image display 270 allows the editor to see the effects of source and composition color modification. If pressed, the previous segment button 232 replaces the active segment with the previous segment in the current image display 229. In the example of FIG. 14, if the previous segment button 232 is pressed, a digital image from the previous segment appears in the current image display 229. Analogously, if the next segment button 234 is pressed, a digital image from the next segment appears in the current image display 229.

During an editing session, various source and program modifications may be defined. Depending on the source and composition relationship attributes chosen during the editing session, various segments of the sequence being represented by the three image display 270 may be affected. The previous unmodified segment button 236 and the next unmodified segment button 238 allow an editor to view the effects of source and composition color modification in an efficient manner.

If the previous unmodified segment button 236 is pressed, a previous segment closest in time to the active segment that has not yet had color modification applied replaces the active segment in the current image display 229. The unmodified segment buttons allow an editor to quickly determine which segments of a sequence have not been color modified. Rather than having to use the next and previous buttons 232 and 234 repeatedly to traverse all the segments in a sequence, even when the segments have already been modified, an editor can simply press buttons 236 and 238 and to view the closest unmodified segments.

In an example embodiment, color function buttons allow an editor to select function screens for both source and composition color modification. For example, tab 244 allows a user to select color functions for source color modification, and tab 246 allows a user to select functions for composition color modification. The color function screens allow an editor to perform specific color modification functions. Color function buttons may include an HSL button 254, a channels button 252, a levels button 250, and a curves button 248. The HSL button 254 brings up an HSL function screen that allows a user to define changes to pixel colors in HSL color space, including defining color modifications to pixel colors as a function of the luma of a pixel. Channels button 252 allows a user to access a channels screen, where channels in this context refers to the red, green, and blue components of an RGB component format. The RGB screen allows a user to modify values of the RGB components as a function a component the RGB components or combinations of the RGB components.

The levels button 250 allows a user to access a levels screen in which a user can determine the effects of RGB color modifications on the luma of the pixel, and to alter the luma of the pixel as a function of the luma of the pixel. Example embodiments of the color modifications available on a levels screen is described in U.S. Pat. No. 6,374,336, filed Apr. 16, 1999.

The curves button 248 allows a user to access a curves screen. An example embodiment of a curves screen is illustrated in user interface 400, in which the curves button has been selected. The curves screen allows a user to define color modifications for a red, green, or blue component of a color, or for all three components of the color. The curve screen includes a red graph 280, a green graph 282, and a blue graph 284 for defining the functions of the individual components, and a master graph 286 for defining a function that is applied to all three color components. In each graph, the horizontal axis represents an input value of the function, while the vertical axis represents the output value of the function. Each graph may include control points that if added, moved or deleted alter a curve representing the function, thereby altering the function.

For example, for the green graph 282, by altering any of the control points 292, 294, 296, and 298, the green curve 300 is altered, thereby redefining a function for the green component. The new values for the functions are determined using interpolation, for example, linear interpolation, cubic splines, or Bezier curves.

In an example embodiment, the curve screen of the user interface 400 allows a user to color match using colors from images of the three-image display 270, text input from a text entry field such as 288, or other color sources. For example, a user may select a color from the image displayed in the next image display screen 230 and apply it to the image in the current image display screen 229. The curve screen allows the user to preview the effect of adding a color to an image, using the graphs 280, 282, 284, and 286. The curve screen also provides a color matching gadget 257 to assist an editor in color matching. The color matching gadget 257 includes an input swatch 261 and an output swatch 260. The RGB values of the selected colors for color matching are displayed in the swatches. The RGB graphs 280, 282, 284, and 286 allow the user to preview these colors without committing to a change in the functions represented by these graphs.

Typically, an editor picks from the. current image display 229 for the source color, the value of which is displayed in the input color swatch 261, and picks from a known good color, the value of which is displayed in the output color swatch 260. A known good color may be provided by a color palette, or from another image, such as the image displayed in the previous image display 228 or the next image display 230. The user may select how they would like to match the color. There may be eight choices, including: master, R+G+B, R+G, G+B, B+G, Red, Green, Blue. If an editor picks R+G+B as the match type, as displayed in selection box 258 of the user interface 400, and hits the match color button 256, then a new control point is added to each of the red, green, and blue graphs 280, 282, and 284, respectively. Hash marks or some other indicator on the graphs represent the changes to those graphs resulting from the color match. For example, the hash mark 294' on the green graph 282 represents a change in the value of the control point 294, which alters the green component function.

In an embodiment of color matching, the hue and saturation of the output color are automatically adjusted to match how objects behave under natural lighting environments. For example, if an object is illuminated from natural light, the ratios between the RGB values of the object remain proportional from areas of the object highly illuminated by the light to darker areas of the object not illuminated by as much light.

Natural color matching operates in the following manner. Given a source color, $R_S$, $G_S$, $B_S$, for example, the color represented in the input color swatch 286, and a destination color $R_D$, $G_D$, $B_D$, for example, the output color represented by the output color swatch 260, an adjusted destination color, $R'_D$, $G'_D$, $B'_D$ is determined.

The luminance of the source color, $Y_S$ may be defined as:

$$Y_S = 0.299 \cdot R_S + 0.587 \cdot G_S + 0.114 \cdot B_S \qquad \text{Equation 1}$$

Input red/luminance ratio, $\rho_{RS}$, input green/luminance ratio, $\rho_{GS}$, and input blue/luminance ratio, $\rho_{BS}$, may be defined as:

Equation 2:
$$\rho_{RS} = \frac{R_S}{Y_S}$$

Equation 3:
$$\rho_{GS} = \frac{G_S}{Y_S}$$

Equation 4:
$$\rho_{BS} = \frac{B_S}{Y_S}$$

The luminance of the destination color, $Y_D$, may be defined as:

$$Y_D = 0.299 \cdot R_D + 0.587 \cdot G_D + 0.114 \cdot B_D \qquad \text{Equation 5}$$

Output red/luminance ratio, $\rho_{RD}$, output green/luminance ratio, $\rho_{GD}$, and output blue/luminance ratio, $\rho_{BD}$, may be defined as:

Equation 6:
$$\rho_{RD} = \frac{R_D}{Y_D}$$

Equation 7:
$$\rho_{GD} = \frac{G_D}{Y_D}$$

Equation 8:
$$\rho_{BD} = \frac{B_D}{Y_D}$$

Adjusted red/luminance ratio, $\rho'_{RD}$, adjusted green/luminance ratio, $\rho'_{GD}$, and adjusted blue/luminance ratio, $\rho'_{BD}$, may be defined as:

Equation 9:

$$R'_D = \frac{\rho_{RD}}{\rho_{RS}} R_S = \frac{Y_S}{Y_D} R_D$$

Equation 10:

$$G'_D = \frac{\rho_{GD}}{\rho_{GS}} G_S = \frac{Y_S}{Y_D} G_D$$

Equation 11:

$$B'_D = \frac{\rho B_D}{\rho B_D} B_D = \frac{Y_S}{Y_D} B_D$$

In a color difference space, such as YCbCr, the Y value represents the luminance and the two color components, CbCr, represent the chrominance. Chrominance may be defined by two values: hue, which is defined by the angle of the vector $(0,0) \rightarrow (Cb,Cr)$, and saturation which is the magnitude of this vector and may be defined as $\sqrt{C_b^2 + C_r^2}$.

Figure 15:
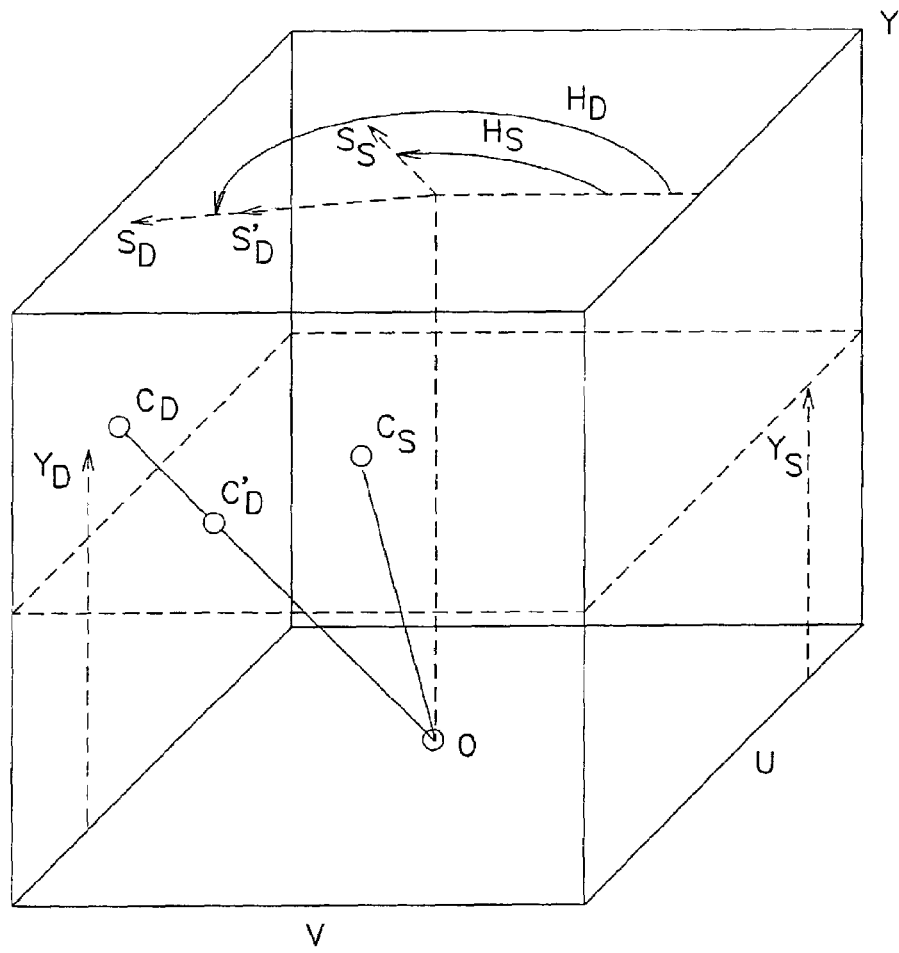
FIG. 15 is an illustration describing operation in the HSL color space.

FIG. 15 illustrates the effect of natural color matching in HSL space. By matching the ratios of RGB to luminance, a resulting modified image adopts the hue $H_D$ of the specified destination color, $C_D$ (that has luminance $Y_D$), but maintains the luminance $Y_S$ of the source color $C_S$ (that has hue $H_S$). If a destination vector is drawn from the black point O to the destination color $C_D$, the adjusted color, $C'_D$, is located at the intersection of this destination vector and a plane defined by the source luma $Y_S$. The saturation $S'_D$ of the adjusted color, $C'_D$, also differs from the saturations of the destination color $S_D$ and the source color $S_S$ and is the magnitude of an adjusted vector that may be defined as $\sqrt{C'_b{}^2 + C'_r{}^2}$.

Natural color matching may be used to match any combination of the red, green, and blue components. R+G+B matching was described above. Natural matching with the master curve affects luminance only. Six other combinations that can be used are: R+G, G+B, B+G, Red, Green, and Blue.

An embodiment of natural color matching allows a user to select the other color match combinations, R+G, G+B, B+G, Red, Green, Blue. The process of naturally matching colors for these selections is similar to matching with all three RGB components as described above. Ratios are determined by dividing the selected components of a color by the weighted sum of the components not selected. One may consider two classes of these selections: single component selections including Red, Green, and Blue, and two component selections including R+G, G+B, and B+G.

For single component selections, given the source color components, $R_S$, $G_S$, and $B_S$, and the destination color components $R_D$, $G_D$, $B_D$, an adjusted destination component may be determined as follows, using an adjusted red component, $R'_D$, as an example. A weighted sum of the green and blue source components, $G_D$ and $B_D$ approximates source luminance, $Y_S$. This weighted sum may be defined by the following equation:

Equation 12:

$$Y_S = \frac{0.587 \cdot G_S + 0.114 \cdot B_S}{0.587 + 0.114}$$

The source red/luminance ratio, $\rho_{RS}$, of the source color is determined. The source red/luminance ratio $\rho_{RS}$ may be defined by the following equation:

Equation 13:

$$\rho_{RS} = \frac{R_S}{Y_S}$$

A weighted sum of the green and red destination components, $G_S$ and $B_S$, may approximate the destination luminance, $Y_D$. This weighted sum may be defined by the equation:

Equation 14:

$$Y_D = \frac{0.587 \cdot G_D + 0.114 \cdot B_D}{0.587 + 0.114}$$

The destination red/luminance ratio, $\rho_{RS}$, is determined. The source red/luminance ratio $\rho_{RS}$ may be defined by the following equation:

Equation 15:

$$\rho_{RD} = \frac{R_D}{Y_D}$$

The adjusted red component, $R'_D$, may be determined by combining Equations 12–15 to produce the following equation:

Equation 16:

$$R'_D = \frac{\rho_{RD}}{\rho_{RD}} R_S = \frac{Y_S}{Y_D} R_D$$

For two component selections, given the source color components, $R_S$, $G_S$, and $B_S$, and the destination color components $R_D$, $G_D$, $B_D$, an adjusted destination component may be determined as follows, using adjusted red and blue components, $R'_D$ and $B'_D$ as examples. The green source component approximates source luminance, $Y_S$.

$$G_{S=YS}$$ Equation 17

A source red/luminance ratio $\rho_{RS}$ and a source blue/luminance ratio $\rho_{BS}$ is determined. These ratios may be defined by the following equations:

Equation 18:

$$\rho_{RS} = \frac{R_S}{Y_S}$$

Equation 19:

$$\rho_{BS} = \frac{B_S}{Y_S}$$

The green component of the source color, $G_D$, may approximate luminance, $Y_D$ $$Y_{D=GD}$$ Equation 20

The destination red/luminance ratio $\rho_{RD}$ and the destination blue/luminance ratio $\rho_{BD}$ are determined. These ratios may be defined by the following equations:

Equation 21:
$$\rho_{RD} = \frac{R_D}{Y_D}$$

Equation 22:
$$\rho_{BD} = \frac{B_D}{Y_D}$$

Equations 17–22 may be combined to determine the adjusted red and blue components R'$_D$ and B'$_D$ as defined by the following equations:

Equation 23:
$$R'_D = \frac{\rho_{RD}}{\rho_{RS}} R_S = \frac{Y_S}{Y_D} R_D$$

Equation 24:
$$B'_D = \frac{\rho_{BD}}{\rho_{BS}} B_S = \frac{Y_S}{Y_D} B_D$$

Thus, natural color matching adjusts the values of the selected destination color components as a product of the ratio of the source and destination luminance of the selected components and the value of destination component.

FIG. 16 is a block diagram illustrating an embodiment of source and composition color modifications data structures 138 and 140, respectively. Both the source and composition modification structures 138 and 140 may include color modifications specific to a HSL, channels, levels, and curves color functions and parameters. Parameters may be considered a subclass of functions as parameters are essentially simple linear functions or constants. Both the data structures 138 and 140 may include references to other data structures specific to the color functions, for example, HSL modifications data structure 404, channels modifications data structure 406, levels modifications data structure 408, and curves modifications data structure 410 These functions may have been defined through the user interface 400 described above in connection with FIG. 14, using the color function buttons 254, 252, 250, and 248 to access the HSL, channel, levels, and curves screen, respectively.

In FIG. 16, if there are multiple sub-structures that are identical in form, then only one of the sub-structures are illustrated in full detail. Items in a data structure followed by a " " character indicates a sub-structure indicated by an arrow to the sub-structure. For example, in the source color modification data structure 138, the next to "HSL" indicates that there is a sub-structure 404 defining HSL color modifications. Items followed by a "§" character indicates a parameter, with a category in parentheses. For example, in the channels color modification data structure 406, the • next to "preview_mode (num)" indicates that there is a numeric parameter defining the preview mode selected by a user. Items followed by a "ƒ" indicate a function. Functions may be stored as fixed length array of input/output pairs of values. These values are used to calculate a lookup table that define the function. For example, in the curves color modification data structure 410, the ƒ next to "red (rgb)" indicates a function for RGB component curves. Using functions and lookup tables to define color modifications is described in U.S. Pat. No. 6,552,731, filed Apr. 16, 1999, pending, and U.S. Pat. No. 6,417,891, filed Apr. 16, 1999 (the Cacciatore patent). The data structures of FIG. 16 may be used to define coefficients for a matrix or values of a lookup table as described in the Cacciatore patent. A multimedia composition may be represented and edited with a typical computer system. It should be understood that the invention is not limited to any specific computer described herein. Many other different machines may be used to implement source color modification. Such a suitable computer system includes a processing unit which performs a variety of functions and a manner well-known in the art in response to instructions provided from an application program. The processing unit functions according to a program known as the operating system, of which many types are known in the art. The steps of an application program are typically provided in random access memory (RAM) in machine-readable form because programs are typically stored on a non-volatile memory, such as a hard disk or floppy disk. When a user selects an application program, it is loaded from the hard disk to the RAM, and the processing unit proceeds through the sequence of instructions of the application program.

The computer system also includes a user input/output (I/O) interface. The user interface typically includes a display apparatus (not shown), such as a cathode-ray-tube (CRT) display in an input device (not shown), such as a keyboard or mouse. a variety of other known input and output devices may be used, such as speech generation and recognition units, audio output devices, etc.

The computer system also includes a video and audio data I/O subsystem. Such a subsystem is well-known in the art and the present invention is not limited to the specific subsystem described herein. The audio portion of subsystem includes an analog-to-digital (A/D) converter (not shown), which receives analog audio information and converts it to digital information. The digital information may be compressed using known compression systems, for storage on the hard disk to use at another time. a typical video portion of subsystem includes a video image compressor/decompressor (not shown) of which many are known in the art. Such compressor/decompressors convert analog video information into compressed digital information. The compressed digital information may be stored on hard disk for use at a later time. An example of such a compressor/decompressor is described in U.S. Pat. No. 5,355,450.

It should be understood that one or more output devices may be connected to a playback system or editing system implementing source and/or composition color modification. Example output devices include a cathode ray tube (CRT) display, liquid crystal displays (LCD) and other video output devices, printers, communication devices such as a modem, storage devices such as disk or tape, and audio output. It should also be understood that one or more input devices may be connected to the editing or playback system. Example input devices include a keyboard, keypad, track ball, mouse, pen and tablet, communication device, and data input devices such as audio and video capture devices and sensors. It should be understood that source and color modification are not limited to the particular input or output devices used in combination with the computer system or to those described herein.

The editing or playback system may be a general purpose computer system which is programmable using a computer programming language, such as "C++," JAVA or other language, such as a scripting language or even assembly language. The computer system may also be specially programmed, special purpose hardware. In a general purpose computer system, the processor is typically a commercially available processor, such as the series x86 and Pentium processors, available from Intel, similar devices from AMD and Cyrix, the 680X0 series microprocessors available from Motorola, and the PowerPC microprocessor from IBM. Many other processors are available. Such a microprocessor executes a program called an operating system, of which WindowsNT, Windows95 or 98, UNIX, Linux, DOS, VMS, MacOS and OS8 are examples, which controls the execution of other computer programs and provides scheduling, debugging, input/output control, accounting, compilation, storage assignment, data management and memory management, and communication control and related services. The processor and operating system define a computer platform for which application programs in high-level programming languages are written.

A memory system typically includes a computer readable and writeable nonvolatile recording medium, of which a magnetic disk, a flash memory and tape are examples. The disk may be removable, known as a floppy disk, or permanent, known as a hard drive. A disk has a number of tracks in which signals are stored, typically in binary form, i.e., a form interpreted as a sequence of one and zeros. Such signals may define an application program to be executed by the microprocessor, or information stored on the disk to be processed by the application program. Typically, in operation, the processor causes data to be read from the nonvolatile recording medium into an integrated circuit memory element, which is typically a volatile, random access memory such as a dynamic random access memory (DRAM) or static memory (SRAM). The integrated circuit memory element allows for faster access to the information by the processor than does the disk. The processor generally manipulates the data within the integrated circuit memory and then copies the data to the disk after processing is completed. A variety of mechanisms are known for managing data movement between the disk and the integrated circuit memory element, and the invention is not limited thereto. It should also be understood that the invention is not limited to a particular memory system.

Such a system may be implemented in software or hardware or firmware, or a combination of the three. The various elements of the system, either individually or in combination may be implemented as a computer program product tangibly embodied in a machine-readable storage device for execution by a computer processor. Various steps of the process may be performed by a computer processor executing a program tangibly embodied on a computer-readable medium to perform functions by operating on input and generating output. Computer programming languages suitable for implementing such a system include procedural programming languages, object-oriented programming languages, and combinations of the two.

It should be understood that the playback system or editing system used to implement source or composition modification is not limited to a particular computer platform, particular processor, or particular programming language. Additionally, the computer system may be a multi processor computer system or may include multiple computers connected over a computer network. It should be understood that each step of FIGS. 9–11, and 13 may be separate modules of a computer program, or may be separate computer programs. Such modules may be operable on separate computers.

Having now described some embodiments, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A graphical user interface for facilitating color modification of moving images on a display of a general purpose computer, comprising:
    means for receiving a composition of a sequence of segments of sources of moving image data;
    means for enabling a user to specify one of the segments in the composition as a current segment;
    a three-image display, including:
        a first region on the display, for displaying an image from the current segment in the sequence to which a color modification is to be applied,
        a second region on the display and adjacent to the first region, for displaying an image from a previous segment in the sequence before the current segment, and
        a third region on the display and adjacent to the first region, for displaying an image from a next segment in the sequence after the current segment; and
    a function screen for selecting a color modification to be performed to the current image.

2. The graphical user interface of claim 1, wherein the function screen comprises:
    an interface that simultaneously displays a plurality of user modifiable graphs, including a first graph for a red component, a second graph for a blue component, and a third graph for a green component, wherein each graph maps input values for a color component of a pixel on a first axis to output values for the color component for the pixel on a second axis.

3. The graphical user interface of claim 2, wherein each graph is displayed in a rectangular display region having the first axis displayed horizontally and the second axis displayed vertically.

4. The graphical user interface of claim 2, wherein the function screen further comprises:
    a color matcher, including a first swatch representing a source color and a second display swatch displayed contiguously with the first swatch and representing a destination color to which pixels of the source color are to be matched, wherein values for components representing the first color are displayed on the first swatch and wherein values for components representing the second color are displayed on the second swatch.

5. The graphical user interface of claim 4, wherein the computed value for each component specifying the new color and a value of the corresponding component of the source color define a control point of the graph for the component.

6. The graphical user interface of claim 4, further comprising a means to select the source color from the image of the current segment and a means to select the destination color from the image of one of the previous segment and the next segment.

7. The graphical user interface of claim 4, further comprising a means for a user to select a kind of color matching to be performed.

8. The graphical user interface of claim 1, further comprising a control panel displayed on the display and including a position indicator that indicates the temporal position of the image displayed in the first region within the current segment.

9. The graphical user interface of claim 8, further comprising a control panel displayed on the display and including:
- a previous segment selector to allow a user to select a previous segment in the sequence as the current segment, and wherein selection of the previous segment selector causes images in the three-image display to be updated; and
- a next segment selector to allow a user to select a next segment in the sequence as the current segment, and wherein selection of the next segment selector causes images in the three-image display to be updated.

10. The graphical user interface of claim 9, farther comprising a control panel displayed on the display and including:
- a previous unmodified segment selector to allow a user to select a previous unmodified segment in the sequence as the current segment, and wherein selection of the previous unmodified segment selector causes images in the three-image display to be updated; and
- a next unmodified segment selector to allow a user to select a next unmodified segment in the sequence as the current segment, and wherein selection of the next unmodified segment selector causes images in the three-image display to be updated.

11. The graphical user interface of claim 1, further comprising a control panel displayed on the display and including:
- a previous segment selector to allow a user to select a previous segment in the sequence as the current segment, and wherein selection of the previous segment selector causes images in the three-image display to be updated; and
- a next segment selector to allow a user to select a next segment in the sequence as the current segment, and wherein selection of the next segment selector causes images in the three-image display to be updated.

12. The graphical user interface of claim 11, further comprising a control panel displayed on the display and including:
- a previous unmodified segment selector to allow a user to select a previous unmodified segment in the sequence as the current segment, and wherein selection of the previous unmodified segment selector causes images in the three-image display to be updated; and
- a next unmodified segment selector to allow a user to select a next unmodified segment in the sequence as the current segment, and wherein selection of the next unmodified segment selector causes images in the three-image display to be updated.

13. The graphical user interface of claim 1, further comprising a control panel displayed on the display and including:
- a previous unmodified segment selector to allow a user to select a previous unmodified segment in the sequence as the current segment, and wherein selection of the previous unmodified segment selector causes images in the three-image display to be updated; and
- a next unmodified segment selector to allow a user to select a next unmodified segment in the sequence as the current segment, and wherein selection of the next unmodified segment selector causes images in the three-image display to be updated.

14. The graphical user interface of claim 1, wherein the function screen comprises:
- a color matcher, including a first swatch representing a source color and a second display swatch displayed contiguously with the first swatch and representing a destination color to which pixels of the source color are to be matched, wherein values for components representing the first color are displayed on the first swatch and wherein values for components representing the second color are displayed on the second swatch; and
- wherein the color modification is defined by values for components of a new color according to a relationship between the source color and the destination color.

15. The graphical user interface of claim 14, wherein the color modification is defined by a graph for each component that maps input values for the component on a first axis to output values for the component on a second axis, and wherein the computed value for each component specifying the new color and the value of the corresponding component of the source color define a control point of the graph that represents color modifications for the component.

16. The graphical user interface of claim 14, further comprising a means to select the source color from the image of the current segment and a means to select the destination color from the image of one of the previous segment and the next segment.

17. The graphical user interface of claim 14, further comprising a means for a user to select a kind of color matching to be performed.

18. A graphical user interface for performing color modifications, comprising:
- an interface that simultaneously displays a plurality of user modifiable graphs, including a first graph for a red component, a second graph for a blue component, and a third graph for a green component, wherein each graph maps input values for a color component of a pixel on a first axis to output values for the color component for the pixel on a second axis; and
- means for processing modifications made to the graphs to define a color correction operation.

19. The graphical user interface of claim 18, wherein each graph is displayed in a rectangular display region having the first axis displayed horizontally and the second axis displayed vertically.

20. The graphical user interface of claim 18, further comprising a fourth graph defining a master graph defining a function that is applied to all components.

21. The graphical user interface of claim 18, wherein each graph is defined by one or more control points.

22. The graphical user interface of claim 21, wherein the one or more control points are user modifiable.

23. The graphical user interface of claim 21, wherein each control point is defined by a color matching operation that computes a value for a component of a new color from a value for the component from a source color according to a relationship between a source color and a destination color.

24. The graphical user interface of claim 18, further comprising:
- a color matcher, including a first swatch representing a source color and a second display swatch displayed contiguously with the first swatch and representing a destination color to which pixels of the source color are to be matched, wherein values for components representing the first color are displayed on the first swatch and wherein values for components representing the second color are displayed on the second swatch; and
- wherein the computed value for each component specifying the new color and a value of the corresponding component of the source color define a control point of the graph for the component.

25. The graphical user interface of claim 24, further comprising a means to select the source color from the image of the current segment and a means to select the destination color from the image of one of the previous segment and the next segment.

26. The graphical user interface of claim 24, further comprising a means for a user to select a kind of color matching to be performed.

27. The graphical user interface of claim 18, further comprising:
   means for designating the color correction operation to be applied to all segments that reference a selected source.

28. The graphical user interface of claim 1, further comprising:
   means for designating the color modification to be applied to all segments that reference a selected source.

29. A graphical user interface for modifying a color in an image to match another color, comprising:
   means for selecting a source color and a destination color;
   means for displaying a first swatch representing the source color and a second swatch contiguous with the first swatch and representing the destination color; and
   means for displaying values for components representing the source color on the first swatch and for displaying values for components representing the destination color on the second swatch; and
   means for instructing the computer to modify the image so that pixels of the selected source color are modified to match the selected destination color according to a selected type of color matching.

30. A color correction system for performing color modification on moving images, comprising:
   means for receiving a composition of a sequence of segments of sources of moving image data;
   means for enabling a user to specify one of the segments in the composition as a current segment;
   a graphical user interface on a display, wherein the graphical user interface includes a three-image display, including:
      a first region on the display, for displaying an image from the current segment in the sequence to which a color modification is to be applied,
      a second region on the display and adjacent to the first region, for displaying an image from a previous segment in the sequence before the current segment, and
      a third region on the display and adjacent to the first region, for displaying an image from a next segment in the sequence after the current segment, and
      a function screen for selecting a color modification to be performed to the current image; and
   means for performing the selected color modification on the current image.

31. The color correction system of claim 30, wherein the function screen comprises:
   an interface that simultaneously displays a plurality of user modifiable graphs, including a first graph for a red component, a second graph for a blue component, and a third graph for a green component, wherein each graph maps input values for a color component of a pixel on a first axis to output values for the color component for the pixel on a second axis.

32. The color correction system of claim 31, wherein each graph is displayed in a rectangular display region having the first axis displayed horizontally and the second axis displayed vertically.

33. The color correction system of claim 31, wherein the function screen further comprises:
   a color matcher, including a first swatch representing a source color and a second display swatch displayed contiguously with the first swatch and representing a destination color to which pixels of the source color are to be matched, wherein values for components representing the first color are displayed on the first swatch and wherein values for components representing the second color are displayed on the second swatch.

34. The color correction system of claim 33, wherein the computed value for each component specifying the new color and a value of the corresponding component of the source color define a control point of the graph for the component.

35. The color correction system of claim 33, further comprising a means to select the source color from the image of the current segment and a means to select the destination color from the image of one of the previous segment and the next segment.

36. The color correction system of claim 33, further comprising a means for a user to select a kind of color matching to be performed.

37. The color correction system of claim 30, wherein the graphical user interface further includes a control panel displayed on the display and including a position indicator that indicates the temporal position of the image displayed in the first region within the current segment.

38. The color correction system of claim 37, wherein the graphical user interface further includes a control panel displayed on the display and including:
   a previous segment selector to allow a user to select a previous segment in the sequence as the current segment, and wherein selection of the previous segment selector causes images in the three-image display to be updated; and
   a next segment selector to allow a user to select a next segment in the sequence as the current segment, and wherein selection of the next segment selector causes images in the three-image display to be updated.

39. The color correction system of claim 38, wherein the graphical user interface further includes a control panel displayed on the display and including:
   a previous unmodified segment selector to allow a user to select a previous unmodified segment in the sequence as the current segment, and wherein selection of the previous unmodified segment selector causes images in the three-image display to be updated; and
   a next unmodified segment selector to allow a user to select a next unmodified segment in the sequence as the current segment, and wherein selection of the next unmodified segment selector causes images in the three-image display to be updated.

40. The color correction system of claim 30, wherein the graphical user interface further includes a control panel displayed on the display and including:
   a previous segment selector to allow a user to select a previous segment in the sequence as the current segment, and wherein selection of the previous segment selector causes images in the three-image display to be updated; and
   a next segment selector to allow a user to select a next segment in the sequence as the current segment, and wherein selection of the next segment selector causes images in the three-image display to be updated.

41. The color correction system of claim 40, wherein the graphical user interface further includes a control panel displayed on the display and including:
    a previous unmodified segment selector to allow a user to select a previous unmodified segment in the sequence as the current segment, and wherein selection of the previous unmodified segment selector causes images in the three-image display to be updated; and
    a next unmodified segment selector to allow a user to select a next unmodified segment in the sequence as the current segment, and wherein selection of the next unmodified segment selector causes images in the three-image display to be updated.

42. The color correction system of claim 30, wherein the graphical user interface further includes a control panel displayed on the display and including:
    a previous unmodified segment selector to allow a user to select a previous unmodified segment in the sequence as the current segment, and wherein selection of the previous unmodified segment selector causes images in the three-image display to be updated; and
    a next unmodified segment selector to allow a user to select a next unmodified segment in the sequence as the current segment, and wherein selection of the next unmodified segment selector causes images in the three-image display to be updated.

43. The color correction system of claim 30, wherein the function screen comprises:
    a color matcher, including a first swatch representing a source color and a second display swatch displayed contiguously with the first swatch and representing a destination color to which pixels of the source color are to be matched, wherein values for components representing the first color are displayed on the first swatch and wherein values for components representing the second color are displayed on the second swatch; and
    wherein the color modification is defined by values for components of a new color according to a relationship between the source color and the destination color.

44. The color correction system of claim 43, wherein the color modification is defined by a graph for each component that maps input values for the component on a first axis to output values for the component on a second axis, and wherein the computed value for each component specifying the new color and the value of the corresponding component of the source color define a control point of the graph that represents color modifications for the component.

45. The color correction system of claim 43, further comprising a means to select the source color from the image of the current segment and a means to select the destination color from the image of one of the previous segment and the next segment.

46. The color correction system of claim 43, further comprising a means for a user to select a kind of color matching to be performed.

47. A color correction system for performing color modification on a sequence of segments of moving images, comprising:
    a graphical user interface for performing color modifications, including:
        an interface that simultaneously displays a plurality of user modifiable graphs, including a first graph for a red component, a second graph for a blue component, and a third graph for a green component, wherein each graph maps input values for a color component of a pixel on a first axis to output values for the color component for the pixel on a second axis; and
        means for processing modifications made to the graphs to define a color correction operation; and
    means for performing the color correction operation on at least one image in at least one segment in the sequence of segments of moving images.

48. The color correction system of claim 47, wherein each graph is displayed in a rectangular display region having the first axis displayed horizontally and the second axis displayed vertically.

49. The color correction system of claim 47, wherein the graphical user interface further includes a fourth graph defining a master graph defining a function that is applied to all components.

50. The color correction system of claim 47, wherein each graph is defined by one or more control points.

51. The color correction system of claim 50, wherein the one or more control points are user modifiable.

52. The color correction system of claim 50, wherein each control point is defined by a color matching operation that computes a value for a component of a new color from a value for the component from a source color according to a relationship between a source color and a destination color.

53. The color correction system of claim 47, further comprising:
    a color matcher, including a first swatch representing a source color and a second display swatch displayed contiguously with the first swatch and representing a destination color to which pixels of the source color are to be matched, wherein values for components representing the first color are displayed on the first swatch and wherein values for components representing the second color are displayed on the second swatch; and
    wherein the computed value for each component specifying the new color and a value of the corresponding component of the source color define a control point of the graph for the component.

54. The color correction system of claim 53, further comprising a means to select the source color from the image of the current segment and a means to select the destination color from the image of one of the previous segment and the next segment.

55. The color correction system of claim 53, further comprising a means for a user to select a kind of color matching to be performed.

56. The color correction system of claim 47, further comprising:
    means for designating the color correction operation to be applied to all segments that reference a selected source.

57. The color correction system of claim 30, further comprising:
    means for designating the color modification to be applied to all segments that reference a selected source.

58. A color correction method for modifying a color in an image to match another color, comprising:
    receiving an indication of a selection of a source color and a destination color;
    displaying a first swatch representing the source color and a second swatch contiguous with the first swatch and representing the destination color;
    displaying values for components representing the source color on the first swatch and displaying values for components representing the destination color on the second swatch; and modifying the image so that pixels of the selected source color are modified to match the selected destination color according to a selected type of color matching.

59. A computer program product, comprising:
a computer readable medium;
computer program instructions stored on the computer readable medium that, when processed by a computer, instructs the computer to implement a color correction system for performing color modification on moving images, comprising:
means for receiving a composition of a sequence of segments of sources of moving image data;
means for enabling a user to specify one of the segments in the composition as a current segment;
a graphical user interface on a display, wherein the graphical user interface includes a three-image display, including:
  a first region on the display, for displaying an image from the current segment in the sequence to which a color modification is to be applied,
  a second region on the display and adjacent to the first region, for displaying an image from a previous segment in the sequence before the current segment, and
  a third region on the display and adjacent to the first region, for displaying an image from a next segment in the sequence after the current segment, and
  a function screen for selecting a color modification to be performed to the current image; and
means for performing the selected color modification on the current image.

60. The computer program product of claim 59, wherein the function screen comprises:
an interface that simultaneously displays a plurality of user modifiable graphs, including a first graph for a red component, a second graph for a blue component, and a third graph for a green component, wherein each graph maps input values for a color component of a pixel on a first axis to output values for the color component for the pixel on a second axis.

61. The computer program product of claim 60, wherein each graph is displayed in a rectangular display region having the first axis displayed horizontally and the second axis displayed vertically.

62. The computer program product of claim 60, wherein the function screen further comprises:
a color matcher, including a first swatch representing a source color and a second display swatch displayed contiguously with the first swatch and representing a destination color to which pixels of the source color are to be matched, wherein values for components representing the first color are displayed on the first swatch and wherein values for components representing the second color are displayed on the second swatch.

63. The computer program product of claim 62, wherein the computed value for each component specifying the new color and a value of the corresponding component of the source color define a control point of the graph for the component.

64. The computer program product of claim 62, wherein the color correction system further includes a means to select the source color from the image of the current segment and a means to select the destination color from the image of one of the previous segment and the next segment.

65. The computer program product of claim 62, wherein the color correction system further includes a means for a user to select a kind of color matching to be performed.

66. The computer program product of claim 59, wherein the graphical user interface further includes a control panel displayed on the display and including a position indicator that indicates the temporal position of the image displayed in the first region within the current segment.

67. The computer program product of claim 66, wherein the graphical user interface further includes a control panel displayed on the display and including:
a previous segment selector to allow a user to select a previous segment in the sequence as the current segment, and wherein selection of the previous segment selector causes images in the three-image display to be updated; and
a next segment selector to allow a user to select a next segment in the sequence as the current segment, and wherein selection of the next segment selector causes images in the three-image display to be updated.

68. The computer program product of claim 67, wherein the graphical user interface further includes a control panel displayed on the display and including:
a previous unmodified segment selector to allow a user to select a previous unmodified segment in the sequence as the current segment, and wherein selection of the previous unmodified segment selector causes images in the three-image display to be updated; and
a next unmodified segment selector to allow a user to select a next unmodified segment in the sequence as the current segment, and wherein selection of the next unmodified segment selector causes images in the three-image display to be updated.

69. The computer program product of claim 59, wherein the graphical user interface further includes a control panel displayed on the display and including:
a previous segment selector to allow a user to select a previous segment in the sequence as the current segment, and wherein selection of the previous segment selector causes images in the three-image display to be updated; and
a next segment selector to allow a user to select a next segment in the sequence as the current segment, and wherein selection of the next segment selector causes images in the three-image display to be updated.

70. The computer program product of claim 69, wherein the graphical user interface further includes a control panel displayed on the display and including:
a previous unmodified segment selector to allow a user to select a previous unmodified segment in the sequence as the current segment, and wherein selection of the previous unmodified segment selector causes images in the three-image display to be updated; and
a next unmodified segment selector to allow a user to select a next unmodified segment in the sequence as the current segment and wherein selection of the next unmodified segment selector causes images in the three-image display to be updated.

71. The computer program product of claim 59, wherein the graphical user interface further includes a control panel displayed on the display and including:
a previous unmodified segment selector to allow a user to select a previous unmodified segment in the sequence as the current segment, and wherein selection of the previous unmodified segment selector causes images in the three-image display to be updated; and
a next unmodified segment selector to allow a user to select a next unmodified segment in the sequence as the current segment, and wherein selection of the next unmodified segment selector causes images in the three-image display to be updated.

72. The computer program product of claim 59, wherein the function screen comprises:
a color matcher, including a first swatch representing a source color and a second display swatch displayed contiguously with the first swatch and representing a destination color to which pixels of the source color are to be matched, wherein values for components representing the first color are displayed on the first swatch and wherein values for components representing the second color are displayed on the second swatch; and
wherein the color modification is defined by values for components of a new color according to a relationship between the source color and the destination color.

73. The computer program product of claim 72, wherein the color modification is defined by a graph for each component that maps input values for the component on a first axis to output values for the component on a second axis, and wherein the computed value for each component specifying the new color and the value of the corresponding component of the source color define a control point of the graph that represents color modifications for the component.

74. The computer program product of claim 72, wherein the color correction system further includes a means to select the source color from the image of the current segment and a means to select the destination color from the image of one of the previous segment and the next segment.

75. The computer program product of claim 72, wherein the color correction system further includes a means for a user to select a kind of color matching to be performed.

76. A computer program product, comprising:
a computer readable medium;
computer program instructions stored on the computer readable medium that, when processed by a computer, instructs the computer to implement a color correction system for performing color modification on a sequence of segments of moving images, comprising:
a graphical user interface for performing color modifications, including:
an interface that simultaneously displays a plurality of user modifiable graphs, including a first graph for a red component, a second graph for a blue component, and a third graph for a green component, wherein each graph maps input values for a color component of a pixel on a first axis to output values for the color component for the pixel on a second axis; and
means for processing modifications made to the graphs to define a color correction operation; and
means for performing the color correction operation on at least one image in at least one segment in the sequence of segments of moving images.

77. The computer program product of claim 46, wherein each graph is displayed in a rectangular display region having the first axis displayed horizontally and the second axis displayed vertically.

78. The computer program product of claim 76, wherein the graphical user interface further includes a fourth graph defining a master graph defining a function that is applied to all components.

79. The computer program product of claim 76, wherein each graph is defined by one or more control points.

80. The computer program product of claim 79, wherein the one or more control points are user modifiable.

81. The computer program product of claim 79, wherein each control point is defined by a color matching operation that computes a value for a component of a new color from a value for the component from a source color according to a relationship between a source color and a destination color.

82. The computer program product of claim 76, wherein the color correction system further comprises:
a color matcher, including a first swatch representing a source color and a second display swatch displayed contiguously with the first swatch and representing a destination color to which pixels of the source color are to be matched, wherein values for components representing the first color are displayed on the first swatch and wherein values for components representing the second color are displayed on the second swatch; and
wherein the computed value for each component specifying the new color and a value of the corresponding component of the source color define a control point of the graph for the component.

83. The computer program product of claim 82, wherein the color correction system further includes a means to select the source color from the image of the current segment and a means to select the destination color from the image of one of the previous segment and the next segment.

84. The computer program product of claim 82, wherein the color correction system further includes a means for a user to select a kind of color matching to be performed.

85. The computer program product of claim 76, wherein the color correction system further comprises:
means for designating the color correction operation to be applied to all segments that reference a selected source.

86. The computer program product of claim 59, wherein the color correction system further comprises:
means for designating the color modification to be applied to all segments that reference a selected source.

87. A computer program product, comprising:
a computer readable medium;
computer program instructions stored on the computer readable medium that, when processed by a computer, instructs the computer to perform a method for modifying a color in an image to match another color, comprising:
receiving an indication of a selection of a source color and a destination color;
displaying a first swatch representing the source color and a second swatch contiguous with the first swatch and representing the destination color;
displaying values for components representing the source color on the first swatch and displaying values for components representing the destination color on the second swatch; and modifying the image so that pixels of the selected source color are modified to match the selected destination color according to a selected type of color matching.

* * * * *

UNITED STATES PATENT AND TRADEMARK OFFICE
CERTIFICATE OF CORRECTION

PATENT NO. : 7,081,900 B2 Page 1 of 1
APPLICATION NO. : 10/440766
DATED : July 25, 2006
INVENTOR(S) : Robert Gonsalves et al.

Figure 13A:
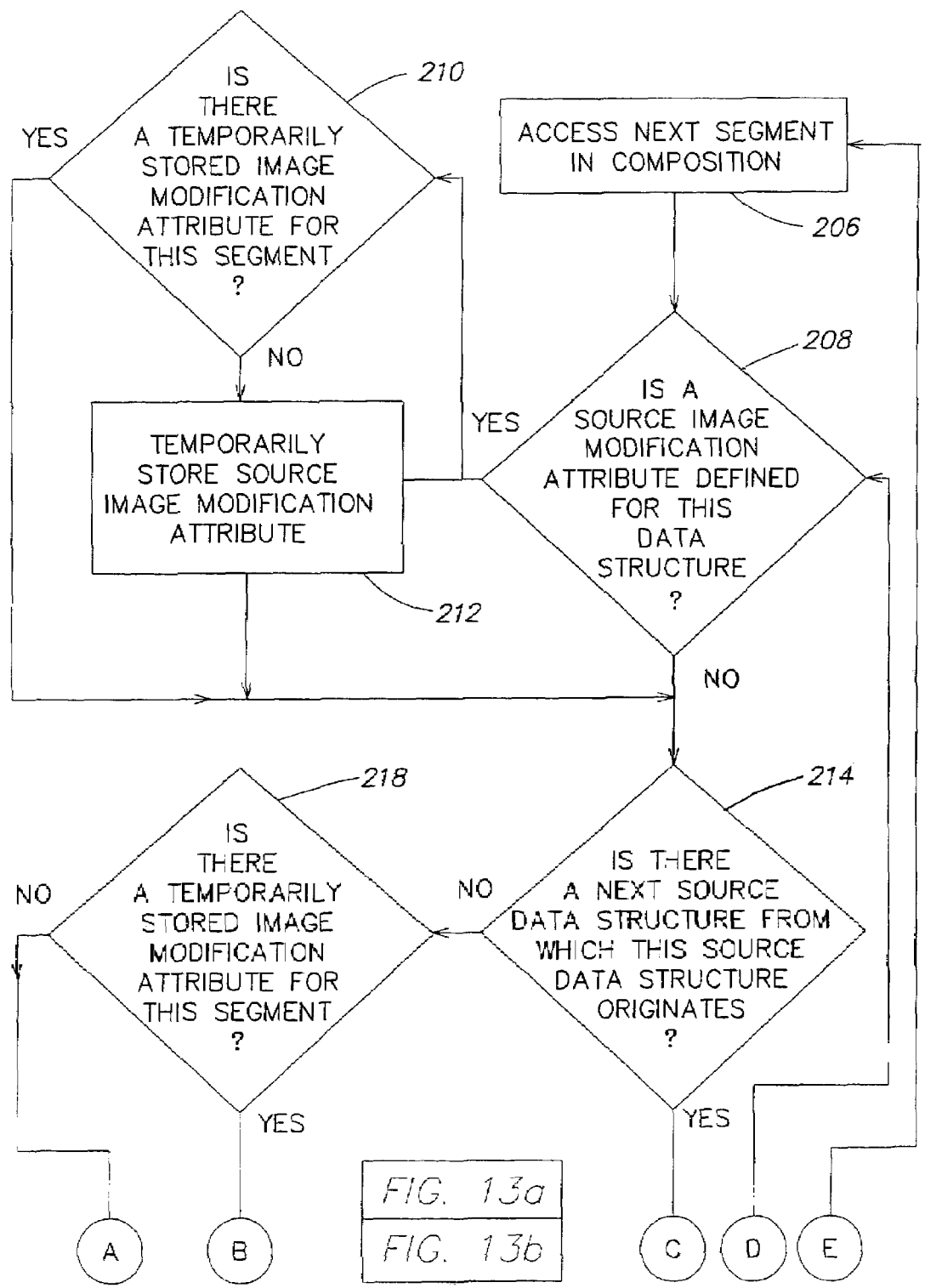
FIG. 13 is a flow chart illustrating an embodiment of a process of implementing source color modification and composition color modification during playback.
Figure 13B:
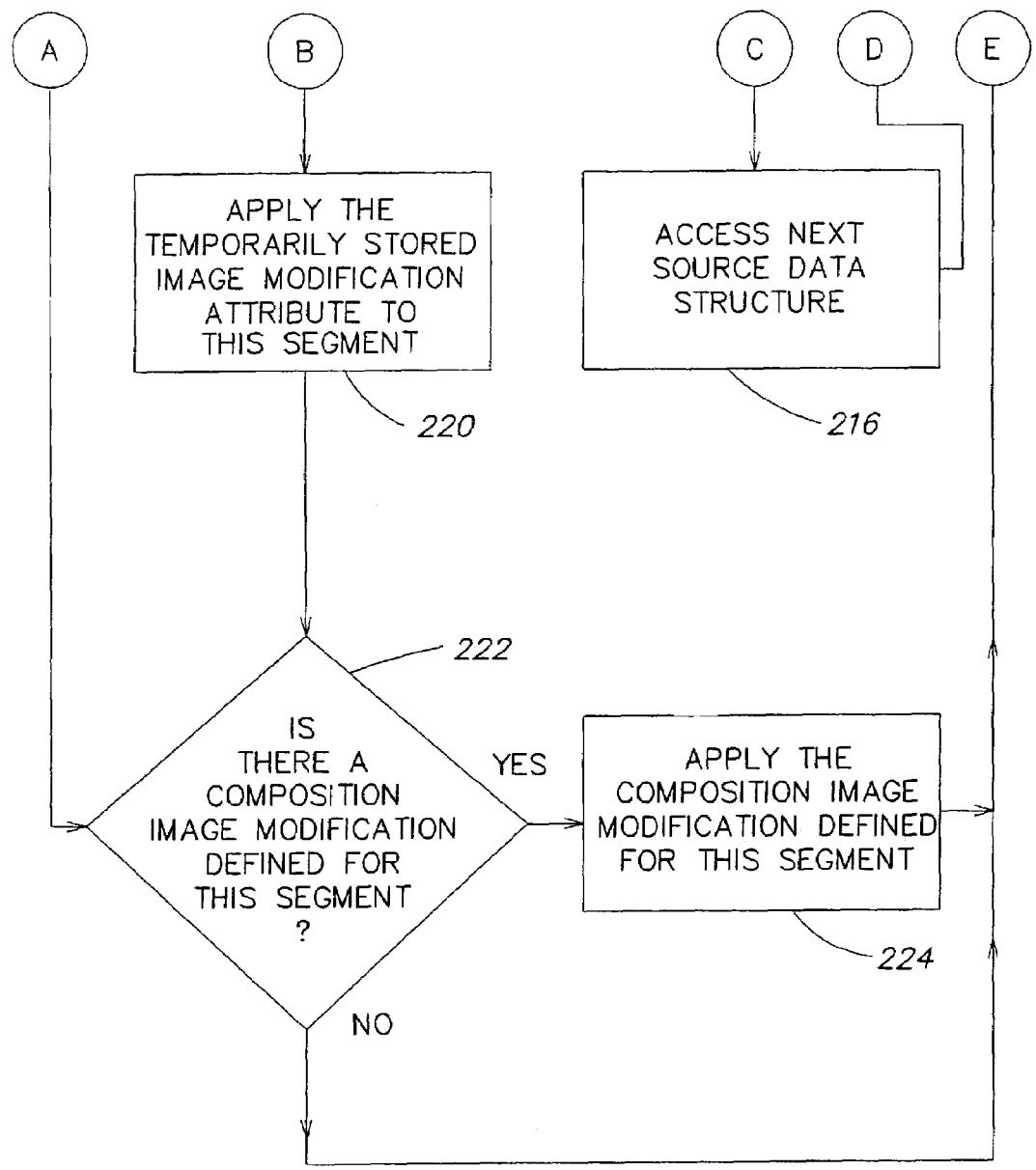
Figure 14A:
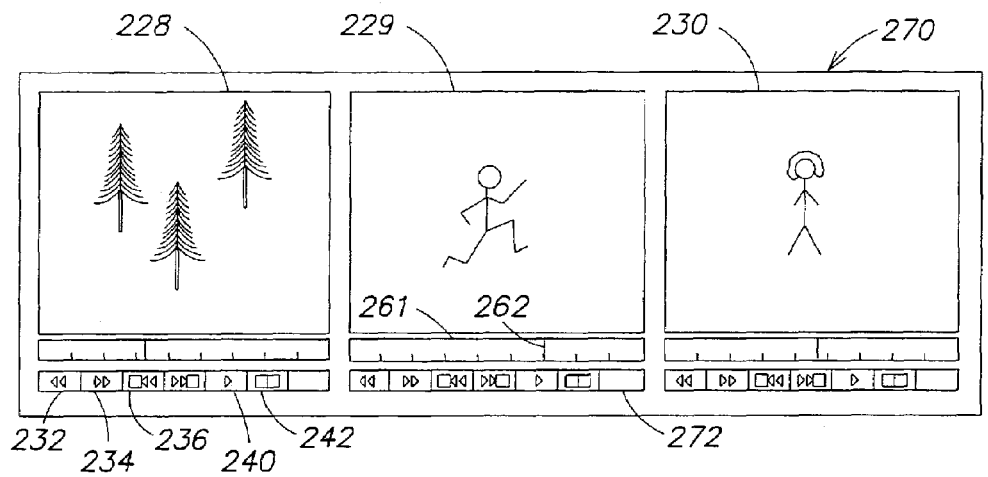
FIG. 14 is an example embodiment of a user interface for color modification.
Figure 14B:
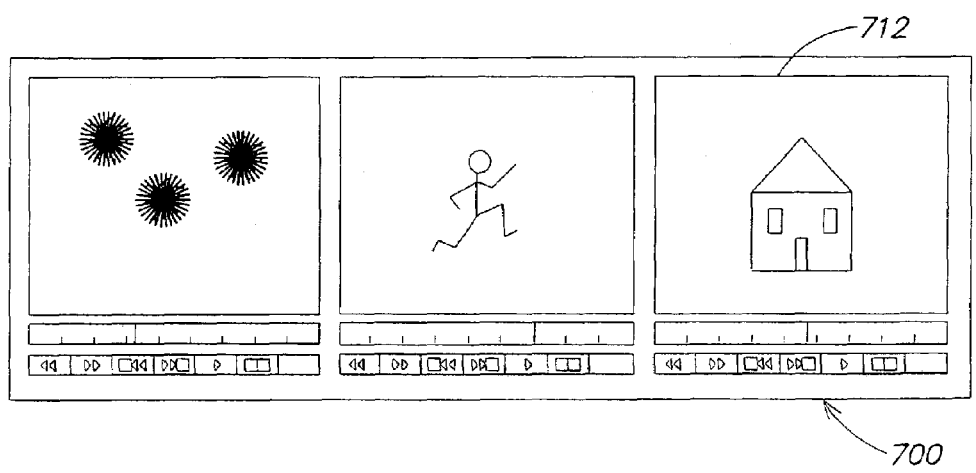
Figure 14C:
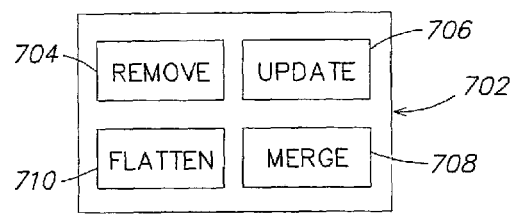
Figure 14D:
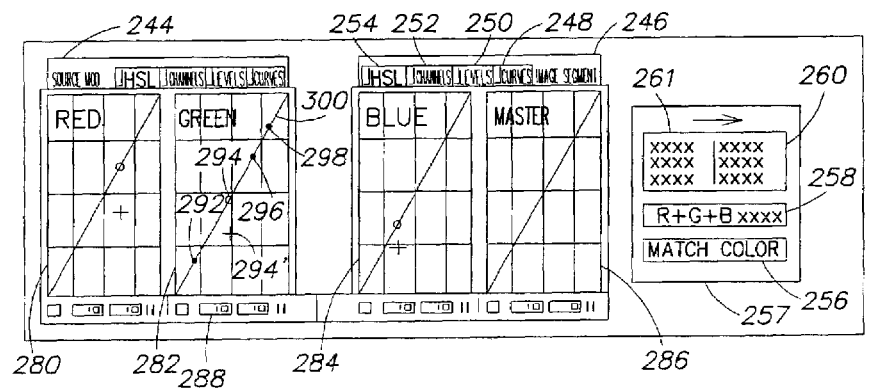
Figure 16A:
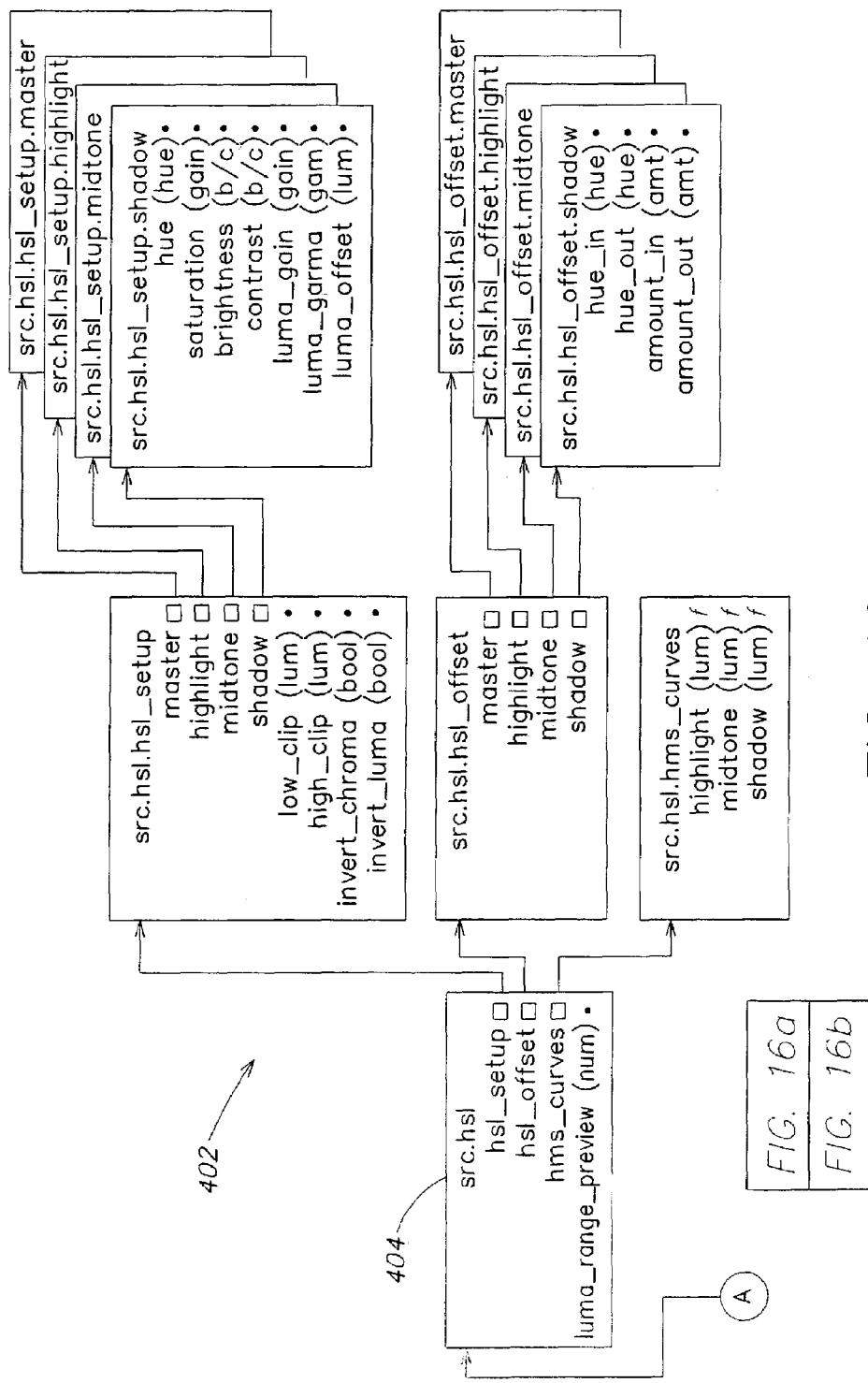
FIG. 16 is a block diagram illustrating an embodiment of the storage of source and composition color modifications.
Figure 16B:
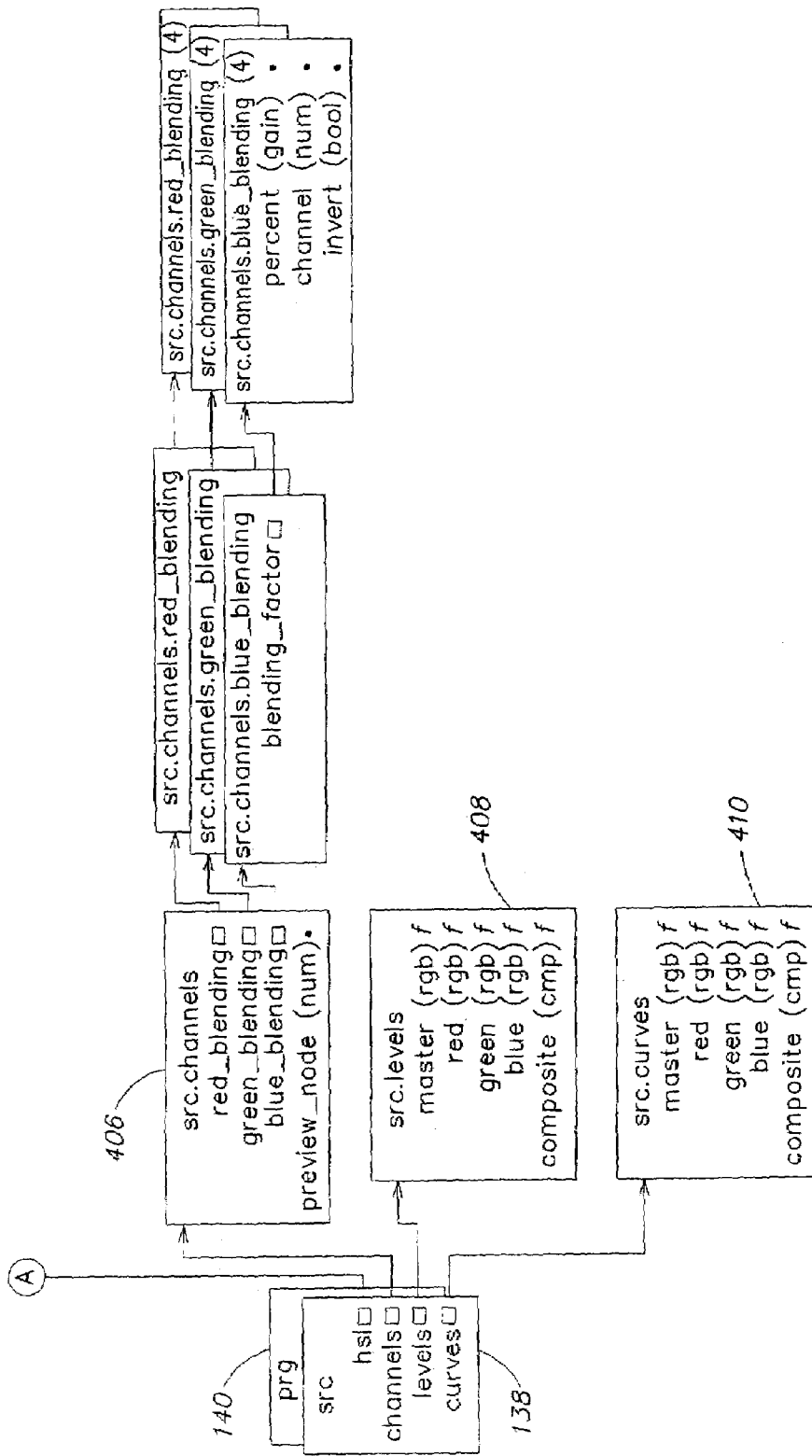

It is certified that error appears in the above-identified patent and that said Letters Patent is hereby corrected as shown below:

Column 4, line 29, the sentence should begin --FIGS. 13a and 13b are flowcharts--;
line 32, the sentence should begin --FIGS. 14a and 14b illustrate an example--;
line 36, the sentence should begin --FIGS. 16a and 16b are block diagrams--.

Column 9, line 45, replace "FIG. 6" with --FIG. 5--.

Column 14, line 16, replace "190" with --198--.

Column 15, line 9, the sentence should begin --FIGS. 13a, 13b show a--.

Column 16, lines 9 and 31, replace "14" with --14a--; line 57, add --of FIG. 14b-- after "embodiment".

Column 21, line 30, the sentence should begin --FIGS. 16a, 16b show a block--.

Signed and Sealed this

Twenty-ninth Day of July, 2008

JON W. DUDAS
*Director of the United States Patent and Trademark Office*